US009715903B2

United States Patent
Gupte et al.

(10) Patent No.: US 9,715,903 B2
(45) Date of Patent: Jul. 25, 2017

(54) DETECTION OF ACTION FRAMES OF A VIDEO STREAM

(71) Applicant: QUALCOMM Incorporated, San Diego, CA (US)

(72) Inventors: Ajit Gupte, Bangalore (IN); Hemanth Acharya, Bangalore (IN); Ajit Venkat Rao, Bangalore (IN); Pawan Kumar Baheti, Bangalore (IN); Padmapriya Jagannathan, San Diego, CA (US); Naveen Srinivasamurthy, Bangalore (IN); Sanjeev Kumar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 14/728,047

(22) Filed: Jun. 2, 2015

(65) Prior Publication Data
US 2015/0364158 A1 Dec. 17, 2015

(30) Foreign Application Priority Data

Jun. 16, 2014 (IN) .......................... 2927/CHE/2014
Aug. 14, 2014 (IN) .......................... 3985/CHE/2014

(51) Int. Cl.
G11B 27/28 (2006.01)
G11B 27/30 (2006.01)
(Continued)

(52) U.S. Cl.
CPC .......... *G11B 27/3081* (2013.01); *G11B 27/28* (2013.01); *H04N 5/144* (2013.01);
(Continued)

(58) Field of Classification Search
None
See application file for complete search history.

(56) References Cited

U.S. PATENT DOCUMENTS 8,064,759 B1 11/2011 Kahn et al.
8,253,564 B2 8/2012 Lee et al.
(Continued)

FOREIGN PATENT DOCUMENTS

EP 2627074 A1 8/2013
WO 2009108508 A1 9/2009
(Continued)

OTHER PUBLICATIONS

"Background Subtraction," retrieved from <<http://en.wikipedia.org/wiki/Background_subtraction>>, retrieved on May 11, 2015, Wikimedia Foundation, San Francisco, CA, pp. 1-6.
(Continued)

*Primary Examiner* — Eileen Adams
(74) *Attorney, Agent, or Firm* — Toler Law Group, P.C.

(57) ABSTRACT

A method includes receiving, at a device, a plurality of image frames corresponding to a video stream. The plurality of image frames include a first image frame having a first resolution and a second image frame having a second resolution that is lower than the first resolution. The method also includes detecting, at the device, a trigger by analyzing the second image frame. The method further includes designating, at the device, the first image frame as an action frame based on the trigger.

28 Claims, 26 Drawing Sheets

(51) Int. Cl.
*H04N 5/14* (2006.01)
*H04N 5/77* (2006.01)
*H04N 9/804* (2006.01)
*H04N 9/806* (2006.01)
*H04N 5/232* (2006.01)

(52) U.S. Cl.
CPC .............. *H04N 5/77* (2013.01); *H04N 9/806* (2013.01); *H04N 9/8047* (2013.01); *H04N 5/23222* (2013.01); *H04N 5/23229* (2013.01); *H04N 5/23245* (2013.01)

(56) References Cited

U.S. PATENT DOCUMENTS

| | | | |
|---|---|---|---|
| 8,274,544 | B2 | 9/2012 | Kurtz et al. |
| 2004/0240551 | A1* | 12/2004 | Itoh ................... H04N 5/145 375/240.16 |
| 2007/0079343 | A1* | 4/2007 | Takashimizu ........ G11B 27/329 725/100 |
| 2009/0238411 | A1* | 9/2009 | Adiletta ............. G06K 9/00771 382/107 |
| 2009/0244390 | A1 | 10/2009 | Feris et al. |
| 2011/0235706 | A1 | 9/2011 | Demircin et al. |
| 2013/0278761 | A1 | 10/2013 | Wu |
| 2013/0330055 | A1 | 12/2013 | Zimmermann et al. |
| 2014/0015930 | A1* | 1/2014 | Sengupta ........... G06K 9/00771 348/46 |
| 2014/0022433 | A1 | 1/2014 | Glennie et al. |

FOREIGN PATENT DOCUMENTS

| | | |
|---|---|---|
| WO | 2012080741 A1 | 6/2012 |
| WO | 2013101853 A2 | 7/2013 |

OTHER PUBLICATIONS

"Viola-Jones Object Detection Framework," retrieved from <<http://en.wikipedia.org/wiki/Viola%E2%80%93Jones_object_detection_framework>>, retrieved on May 11, 2015, Wikimedia Foundation, San Francisco, CA, pp. 1-7.

"Pose (computer vision)," retrieved from <<http://en.wikipedia.org/wiki/Pose_(computer_vision)>>, retrieved on May 11, 2015, Wikimedia Foundation, San Francisco, CA, pp. 1-2.

"FreeTrack," retrieved from <<http://en.wikipedia.org/wiki/FreeTrack>>, retrieved on May 11, 2015, Wikimedia Foundation, San Francisco, CA, pp. 1-6.

"Noise Reduction," retrieved from <<http://wiki.audacityteam.org/wiki/Noise_Reduction>>, retrieved on May 11, 2015, The Audacity Team, pp. 1-6.

"Noise Filtering and the NF575," retrieved from <<http://mcdsp.com/2013/08/06/noise-filtering-and-the-nf575>>, retrieved on May 11, 2015, McDowell Signal Processing, LLC., Mountain View, CA, pp. 1-4.

"Nokia Lumia 925," retrieved from <<http://www.microsoft.com/en-us/mobile/phone/lumia925/>>, retrieved on May 11, 2015, Microsoft Corporation, Redmond, Washington, pp. 1-13.

"Sony Xperia E3," retrieved from <<http://www.three.ie/>>, retrieved on May 15, 2015, Sony Corporation, Tokyo, Japan, pp. 1-5.

Arseneau, S., et al., "Structure Tensor," retrieved from <<http://www.cs.cmu.edu/~sarsen/structureTensorTutorial/>>, retrieved on May 15, 2015, Etovia Systems, Inc., Allison Park, PA, pp. 1-10.

Fischler, M.A., et al., "Random Sample Consensus: A Paradigm for Model Fitting with Applications to Image Analysis and Automated Cartography," Graphics and Image Processing, Jun. 1981, vol. 24, No. 6, ACM, New York, New York, pp. 381-395.

International Search Report and Written Opinion for International Application No. PCT/US2015/044660, ISA/EPO. Date of Mailing Feb. 12, 2016, 21 pages.

Patel, Milin P., et al., "Moving Object Detection with Moving Background Using Optic Flow," Recent Advances and Innovations in Engineering, May 9-11, 2014, IEEE, Piscataway, NJ, 6 pages.

Partial International Search Report for International Application No. PCT/US2015/044660, ISA/EPO, Date of Mailing Nov. 4, 2015, 6 pages.

Xiong, Z., "Audio-visual Sports Highlights Extraction using Coupled Hidden Markov Models," Pattern Analysis and Applications, Sep. 2005, vol. 8, No. 1-2, Springer, New York, NY, pp. 62-71.

Zhang, J., et al., "A Personalized Image Retrieval based on Visual Perception," Journal of Electronics (China), Jan. 2008, vol. 25, No. 1, Springer, New York, NY, pp. 129-133.

Zhang, J., et al., "An Approach of Region of Interest Detection based on Visual Attention and Gaze Tracking," Signal Processing, Communication and Computing, Aug. 12-15, 2012, IEEE, Piscataway, NJ, pp. 228-233.

* cited by examiner

2300 ⤵

┌─ 2206 ──────────────────────────────────────────────────┐
│                                                          │
│   ┌──────────────────────────────────────────┐ ⟵ 2302   │
│   │ Determine, at the device, first data based on the    │
│   │ plurality of image frames, the first data indicative │
│   │ of motion of a first object                          │
│   └──────────────────────────────────────────┘           │
│                         ↓                                │
│   ┌──────────────────────────────────────────┐ ⟵ 2304   │
│   │ Determine, at the device, second data based on the   │
│   │ plurality of image frames, the second data indicative│
│   │ of motion of a second object, where the first object │
│   │ is represented in the second image frame by a first  │
│   │ number of pixels, where the second object is         │
│   │ represented in the second image frame by a second    │
│   │ number of pixels, where the second number of pixels  │
│   │ is larger than the first number of pixels, and where │
│   │ the trigger is detected based on the first data      │
│   │ satisfying a first threshold, the second data        │
│   │ satisfying a second threshold, or both               │
│   └──────────────────────────────────────────┘           │
└──────────────────────────────────────────────────────────┘

┌─ 2502
Receive, at the device, second image frames at the device

┌─ 2504
Determine, at the device, at least one of a head direction of a user or an eye direction of the user based on the second image frames ┌─ 2506
Determine, at the device, a region of interest of the second image frame based on at least one of the head direction or the eye direction, where the trigger is detected based on the region of interest, where the plurality of image frames are received via a first camera, and where the second image frames are received via a second camera

FIG. 25

DETECTION OF ACTION FRAMES OF A VIDEO STREAM

I. CROSS-REFERENCE TO RELATED APPLICATIONS

The present application claims priority from Indian Provisional Patent Application No. 2927/CHE/2014 filed on Jun. 16, 2014 and Indian Provisional Patent Application No. 3985/CHE/2014 filed on Aug. 14, 2014, the contents of which are expressly incorporated herein by reference in their entirety.

II. FIELD

The present application relates generally to the capture of photographs or video, and more specifically, to systems, methods, and devices for detecting action frames of a video stream.

The present application relates generally to the capture of photographs or video, and more specifically, to systems, methods, and devices for detecting action frames of a video stream.

III. DESCRIPTION OF RELATED ART

Users may want to capture events of interest (e.g., child's first steps or words, graduation, or marriage) in photographs or video. An event of interest may be static and predictable (e.g., a wedding, a graduation, a serene landscape, or a portrait). The user may utilize imaging equipment (e.g., a camera, a video recorder, a smartphone, etc.) to capture a predictable and/or static event. Some events of interest may be dynamic (e.g., a child's first steps, a child's first words, a live show, or a natural phenomenon). Even when the dynamic event is predictable and the user is aware of when the event is likely to occur, the user may have to predict an expected direction of the event, set up imaging equipment to capture audio and/or video in the expected direction, and activate the imaging equipment at a proper time to capture the event.

There may be a delay between a first time when the dynamic event begins and a second time when the user activates the imaging equipment to start capturing the dynamic event. The delay may be based on a time for the user to realize that the dynamic event is about to take place, a time for the user to predict an expected direction of the event, a time for the user to set up the imaging equipment to capture events in the expected direction, a time to realize that the dynamic event has started, a time to activate the imaging equipment, etc. Thus, at least some portion of the dynamic event may not be captured by the imaging equipment.

IV. SUMMARY

In a particular aspect, a method includes receiving, at a device, a plurality of image frames corresponding to a video stream. The plurality of image frames include a first image frame having a first resolution and a second image frame having a second resolution that is lower than the first resolution. The method also includes detecting, at the device, a trigger by analyzing the second image frame. The method further includes designating, at the device, the first image frame as an action frame based on the trigger.

In another aspect, an apparatus includes a memory, a first object detector, a first object motion analyzer, a trigger detector, and a frame designator. The memory is configured to store a plurality of image frames corresponding to a video stream. The first object detector is configured to determine whether a first image frame of the plurality of image frames includes a first object. The first object motion analyzer is configured to, when the first object detector determines that the first image frame includes the first object, analyze the first image frame to generate first motion data indicative of motion of the first object. The trigger detector is configured to detect a trigger when the first motion data satisfies a first object motion threshold. The frame designator is configured to designate a second image frame of the plurality of image frames as an action frame based on the trigger.

In another aspect, a computer-readable storage device stores instructions that, when executed by a processor, cause the processor to perform operations including receiving a plurality of image frames corresponding to a video stream. The plurality of image frames include a first image frame having a first resolution and a second image frame having a second resolution that is lower than the first resolution. The first image frame has a first timestamp indicating a first time. The second image frame has a second timestamp indicating a second time. A difference between the first time and the second time satisfies a threshold. The operations also include detecting a trigger by analyzing the second image frame. The operations further include designating the first image frame as an action frame based on the trigger.

V. BRIEF DESCRIPTION OF THE DRAWINGS

Throughout the drawings, similar symbols typically identify similar components, unless context dictates otherwise. Note that the relative dimensions of the following figures may not be drawn to scale.

FIG. 11 is a diagram of an example of the captured image or video frame being divided into a plurality of regions, where the user has defined a region of interest within which the moment of action is searched for;

FIG. 23 is a flow chart of a method of operation at an electronic device of one or more of the systems disclosed herein;

FIG. 25 is a flow chart of a method of operation at an electronic device of one or more of the systems disclosed herein.

VI. DETAILED DESCRIPTION

Figure 1:
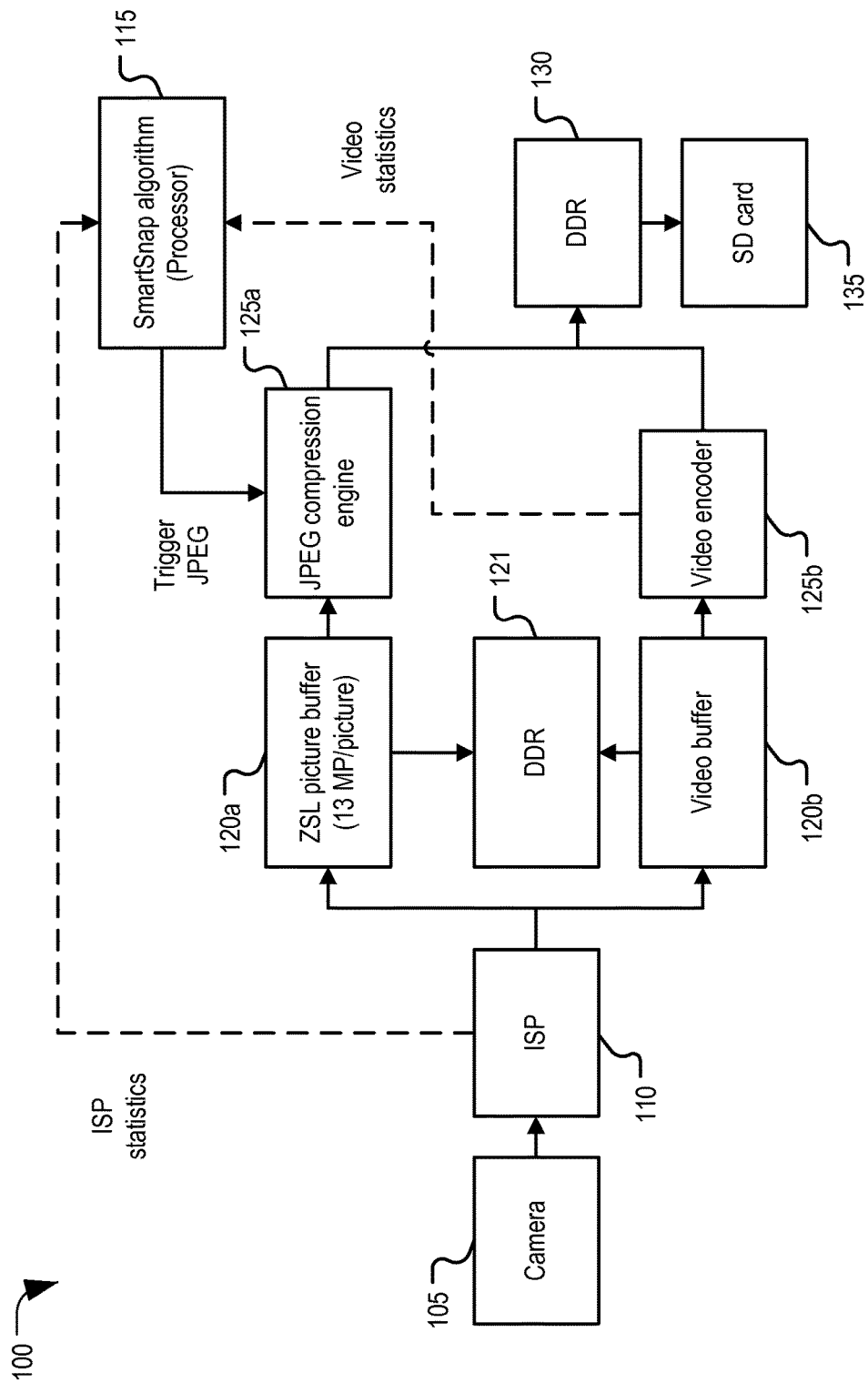
FIG. 1 illustrates a functional block diagram of a photographic device that may be employed to determine if the captured image or video frame contains a moment of action.

Various aspects of the systems, apparatuses, and methods are described more fully hereinafter with reference to the accompanying drawings. The teachings of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different photographic technologies, system configurations, and imaging equipment, some of which are illustrated by way of example in the figures and in the following description of the preferred aspects. The detailed description and drawings are merely illustrative of the disclosure rather than limiting, the scope of the disclosure being defined by the appended claims and equivalents thereof.

As described above, dynamic events may be difficult to photograph. Capturing dynamic events may be of great interest, and numerous implementations attempt to provide users with the ability to capture dynamic events using their imaging equipment (e.g., a camera, a camcorder, or other electronic device that may incorporate a camera, such as smart phones, tablets, digital cameras, computers, etc.). Examples of implementations intending to provide users with the ability to capture moments of action may include a "burst capture mode," which enables the imaging equipment to capture several photographs or video frames in quick succession with a single press, click, or tap of a shutter button. Additionally, some implementations may include "negative shutter lag," which may allow the imaging equipment to capture and store photographs or video beginning a brief period of time before the user activates the camera shutter, and may provide a user with additional time to react to a sudden or unexpected dynamic event. However, these systems do not guarantee that the dynamic event will be captured if the user is delayed in activating the shutter. Additionally, these systems may be limited by available memory (i.e., burst capture modes may more quickly fill available memory due to the capturing of frames rapidly), and may depend on the user to review each of the captured images to determine if the dynamic event was captured. Additionally, the burst mode and the negative shutter lag still rely on the user to be attentive, to have the imaging equipment properly situated, to maintain awareness of the scene, and to be ready to react immediately upon becoming aware of the dynamic event. Accordingly, simplified methods, systems, and apparatus capable of detecting an action frame corresponding to a dynamic event and storing the action frame may be beneficial. Such methods, systems and apparatus are described herein.

For ease of reference, a device, or a component of a device, that may be used to capture an image, take a picture, or record a plurality of consecutive images (for example, video) may sometimes be referred to herein as a camera or imaging equipment. Imaging equipment may be setup to take pictures or record video clips in response to detected movement or remote shutter activation. As discussed above, some imaging equipment may be configured to capture images in rapid succession after the shutter is activated (e.g., burst capture mode) or may be configured to store frames captured a brief period of time before the shutter is activated, either remotely or from detected movement, (e.g., negative shutter lag) to the memory media. The user may select between these modes to activate them based on the dynamic event (e.g., moment of action) to be captured. However, neither of these two modes provide for automatically detecting and capturing moments of action without user input or interaction.

As used herein, the methods, systems, and apparatus discussed below provide solutions to allow imaging equipment to automatically detect, identify, and capture frames determined to contain "moments of action" during a video capture, image capture, or preview session at a high resolution with zero shutter lag (ZSL). Such automatic detection and capture of action moments (e.g., dynamic events) may be applicable in a variety of settings and scenarios, both indoor and outdoor, such as sporting events, live shows, natural events, celebrations, and wild life, just to name a few. Additionally, these methods, systems, and apparatus may be implemented in software or hardware, or a combination thereof, and may comprise systems that are able to be integrated into existing electronic devices. Such a mode to automatically detect, identify, and capture frames containing moments of action may be referred to herein as for ease of disclosure as "SmartSnap mode" or simply "SmartSnap." Use of the terms "SmartSnap mode" or "SmartSnap" in this disclosure is not intended to, and therefore does not, limit these terms in any way, with any known or unknown association with these terms, other than what is explicitly disclosed herein. A SmartSnap mode may allow the user to activate the mode and setup the imaging equipment to capture a scene, and let the imaging equipment automatically detect, identify, and capture the moments of action.

Referring to FIG. 1, a data flow diagram of a device that may be employed to determine if a captured image or a plurality of video frames contain a moment of action is illustrated and designated 100. An imaging system 105 (e.g., a camera) provides one or more pictures and/or a plurality of frames of frames of video data (collectively referred to as "image information") to an image signal processor (ISP) 110. The ISP 110 may serve multiple functions. First, the ISP 110 may perform a series of processing steps on images captured by the imaging equipment and develop statistics from the processed frames to be sent to a processor 115 that is configured to (for example, been provided instructions to run an algorithm to) perform SmartSnap mode processing before sending the captured images to be further processed. For example, the ISP 110 may process the image information of captured video and determine ISP statistics, and may communicate the ISP statistics to the processor 115. Additionally, the ISP 110 may output pictures that are sent to at least one of a JPEG compression engine 125a and a video encoder 125b. The pictures that are sent to the JPEG compression engine 125a may generally be of a higher resolution than the pictures sent to the video encoder 125b. For example, the pictures sent to the video encoder 125b may be of high-definition (HD) resolution, while the pictures sent to the JPEG compression engine 125a may be of the maximum resolution supported by the imaging system 105. The higher quality pictures output from the ISP 110 may first be stored in a ZSL picture buffer 120a, while the lower quality pictures output from the ISP 110 may be stored in a video buffer 120b (e.g., a double data rate (DDR) video memory). Both of the ZSL picture buffer 120a and the video buffer 120b may temporarily store the respective pictures until called on by the JPEG compression engine 125a or the video encoder 125b. The JPEG compression engine 125a compresses individual frames to be stored in a DDR memory 130 in response to a trigger signal from the processor 115, while the video encoder 125b encodes the video clips and communicates macroblock statistic information to the processor 115 before the data flows to the DDR memory 130. The DDR memory 130 receives input from both the JPEG compression engine 125a and the video encoder 125b, and directs the data to a secure digital (SD) card 135, the SD card 135 representing the final storage media for the imaging equipment. The imaging system 105 may be used to capture the initial input image or video clip of the scene to be captured. In some examples, the input may be the result of the user activating the imaging equipment. In other examples, the capture of the initial input image may be automatic when the SmartSnap mode is activated. The imaging system 105 may comprise one or more components of imaging equipment that capture the images, for example the shutter or one or more lenses. The initial input image or video clip may comprise one or more captured frames of a scene.

This input image or video clip may then be provided to the ISP 110, which may perform an analysis of the frame or frames of the input image or video clip or may otherwise extract various ISP statistics from the input image or video clip that may be used by the SmartSnap processor 115 for detecting and identifying moments or events of action within the images or video clips (e.g., detect action images or video clips). Examples of the statistics extracted by the ISP 110 and communicated to the processor 115 for determination of whether a captured image or video contains a moment of action may include colors, focus, zoom, or light information, among others. Details of the statistic extraction and detection and identification of moments of action will be discussed below.

The input image or video is then fed from the ISP 110 to both the ZSL picture buffer 120a and the video buffer 120b. The ZSL picture buffer 120a may comprise a memory capable of storing a quantity of high quality (i.e., high resolution) images, for example images comprising up to 13 mega-pixels (MP) per frame. In some implementations, the ZSL picture buffer 120a may comprise a memory capable of storing a quantity of high quality, high resolution images with resolutions greater than 13 mega-pixels (MP) per frame. The ZSL picture buffer 120a may be a small buffer used to store a number of high resolution images. In some implementations, the ZSL picture buffer 120a may store less than ten high resolution images. In some other implementations, the ZSL picture buffer 120a may store up to one hundred high resolution images.

The video buffer 120b may function similarly to the ZSL picture buffer 120a. The video buffer 120b may be configured to temporarily store a quantity or duration of high quality video clips, for example video clips comprising up to or greater than 13 mega-pixels per frame. From the video buffer 120b, the video clip may flow to the video encoder 125b. In some implementations, the high quality images and video clips of the ZSL picture buffer 120a and the video buffer 120b may be temporarily stored in a DDR memory 121. In some implementations, the DDR memory 121 may function as a first-in-first-out (FIFO) memory structure.

The video encoder 125b may receive the output from the video buffer 120b and encode the input received. While encoding each picture, the video encoder 125b may also generate and dump macroblock level statistics that it collects. These statistics are then communicated to the processor 115 for user in the SmartSnap method to detect and identify frames containing moments of action. The statistics information may be distinct from the information the video encoder 125b stores to the DDR memory 130. The DDR memory 130 is used to store intermediate data such as reference pictures, etc. that may be used for video encoding. The DDR memory 130 may also store the compressed bitstream that the video encoder 125b generates—the main output of the video encoder 125b.

In some implementations, the JPEG compression engine 125a may receive the output from the ZSL picture buffer 120a comprising the high resolution image data. The JPEG compression engine 125a may be configured to compress the image received from the ZSL picture buffer 120a based upon receipt of a trigger from the processor 115. This trigger from the processor 115 may indicate that the image contains a moment of action. For example, the JPEG compression engine 125a may receive a trigger signal from the process 115 indicating a moment of action frame. The JPEG compression engine 125a may then request or extract a frame from the ZSL picture buffer 120a with a timestamp that matches the video frame within which was detected an action frame. The output of the JPEG compression engine 125a may be stored to the SD card 135.

The SmartSnap method may utilize the macroblock level statistics collected and generated by the video encoder 125b (e.g., a video codec) after encoding a picture. These statistics, as discussed in further detail below, may be used by the SmartSnap method to detect an action frame. In some implementations, the processor 115 may receive statistics from the ISP 110 that may be useful in determining and/or detecting frames with moments of action. For example, focus information from the ISP 110 may be used to select pictures with correct focus from a set of action pictures that are originally selected based on the macroblock statistics from the video encoder 125b. Additionally, in some other implementations, the ISP 110 may dump motion and/or color statistics that may be used to detect frames containing moments of action. Some implementations may utilize combinations of the video encoder 125b macroblock statistics and the ISP 110 statistics to determine and identify moments of action within frames.

As will be discussed in further detail below, the method may use the statistics generated by the video encoder 125b to classify the frame being analyzed as a "key" frame or as a "non-key" frame. In some implementations, the classification of frames may use statistics and other inputs generated by other sources, i.e., the ISP 110. Additionally, in some implementations, the method may access macro-block level statistics, i.e., musical video interactive (MVI) data.

The processor 115 may be configured to determine whether or not a frame being analyzed is a "key" frame (i.e., a frame containing a moment of action) and may be configured to indicate that the frame of the image or video being analyzed contains a moment of action and should be saved and qualified as a "key" image. As discussed above, the processor 115 may receive a signal from the ISP 110. This signal may comprise the extracted statistics regarding one or more of the input images being analyzed by the processor 115, as discussed above. Additionally, if the processor 115 is analyzing a video clip, the processor 115 may receive a second signal from the video encoder 125b regarding one or more of the frames of the input video clip being analyzed, the second signal comprising details and statistics of the one or more frames of the video clip being analyzed. The processor 115 may use the statistics from the ISP 110 and the video encoder 125b to determine whether or not a frame is a "key" frame (i.e., contains a moment of action therein). In some implementations, the statistics received at the processor 115 from the ISP 110 and/or the video encoder 125b may be used to improve the selection parameters or qualification of frames as being "key" frames or containing moments of action. As discussed above, in some implementations, the signals received by the processor 115 from the ISP 110 and/or the video encoder 125b may comprise the frames to be analyzed, where the processor 115 performs the statistic extraction and determination of the received frames. Details of the analysis performed by at least one of the ISP 110, the video encoder 125b, or processor 115 to extract the frame statistics and details regarding the frame analysis performed to determine that a frame does or does not contain a moment of action are provided below.

After determining that the frame being analyzed is a "key" frame, the processor 115 outputs a trigger signal (e.g., "trigger JPEG" in FIG. 1) to the JPEG compression engine 125a, which may receive the trigger signal and accordingly compress the frame being analyzed by the processor 115. In some implementations, the processor 115 may be configured to submit the entire "key" frame to the JPEG compression engine 125a for compression into a JPEG file format. In some other implementations, the processor 115 may be configured to submit a signal instructing the JPEG compression engine 125a to compress the data received from the ZSL picture buffer 120a and save it to the storage SD card 135 via the DDR memory 130. In such an implementation, when the JPEG compression engine 125a is to compress a frame of a video clip, the JPEG compression engine 125a may receive the data for the frame of the video clip directly from the video encoder 125b or the ISP 110, and direct the compressed output of the frame to the DDR memory 130 and further to the storage SD card 135.

After the JPEG compression engine 125a and the video encoder 125b perform their respective functions, frames identified as being "key" frames may be stored temporarily in the DDR memory 130 before maybe being saved in the SD card 135. Upon determining the frame is a "key" frame, the processor may trigger the JPEG compression engine 125a to compress the "key" frame for storage as a frame containing a moment of action. The compressed "key" frame may then be stored in a first-in-first-out (FIFO) storage element in the DDR memory 130. Finally, the method may write the compressed frames stored in the FIFO to the memory storage medium. Frames that are determined to not be "key" frames may be actively deleted from the buffered memory or may be temporarily stored in the DDR memory 121 until overwritten by newly captured image of video clip data. Non-key frames may not be maintained at high resolution, as maintaining the non-key frames as such may overwhelm the available memory capacity. For example, in a ten second video, there may be a total of 300 frames, of which 20 may be identified as being action/key frames. Accordingly, the remaining 280 frames, as they are not key frames, may not be saved at high resolution due to the risk of filling the available SD (or similar) memory. Thus, a non-limiting advantage of the SmartSnap method is to successfully select action frames from a selection of frames and reject as many non-action frames as possible, thereby optimizing memory utilization. Once the key frames are stored, the user may be given the option to delete frames that he/she does not wish to save.

Figure 2:
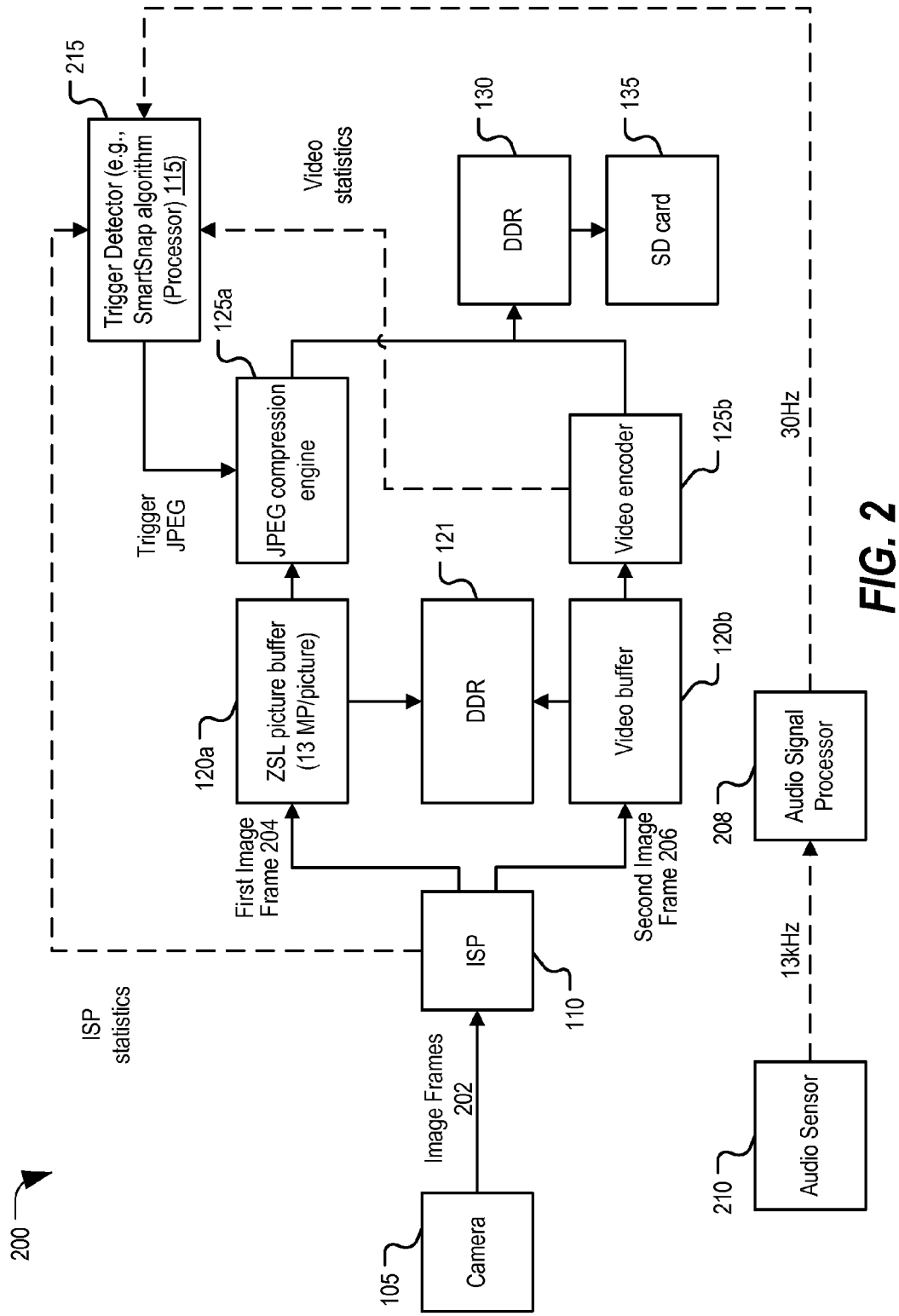
FIG. 2 illustrates a diagram of another example of the device of FIG. 1.

Referring to FIG. 2, a diagram of a device is shown and generally designated 200. The device 200 includes an audio sensor 210 (e.g., a microphone) coupled, via an audio signal processor 208, to a trigger detector 215. The trigger detector 215 may correspond to the processor 115 of FIG. 1.

During operation, the ISP 110 may receive image frames 202 from the imaging system 105. The image frames 202 may correspond to a video stream. The ISP 110 may generate second image frames from the image frames 202. For example, the second image frames may be a lower resolution copy of the image frames 202. The ISP 110 may provide the image frames 202 to the ZSL picture buffer 120a and may provide the second image frames to the video buffer 120*b*. The image frames 202 may include a first image frame 204. The second image frames may include a second image frame 206. The first image frame 204 may represent a first camera view that is substantially the same as a second camera view represented by the second image frame 206. A view may correspond to a viewing angle, a viewing distance, or both, of the imaging system 105. Thus, the first image frame 204 and the second image frame 206 may correspond to substantially the same viewing angle, viewing distance, or both. The first image frame 204 may have a first timestamp indicating a first time. The second image frame 206 may have a second timestamp indicating a second time. A difference between the first time and the second time may satisfy a threshold. The threshold may be fixed or variable. The threshold may have a default value. In a particular aspect, the threshold may be user-defined. For example, the device 100 (or the device 200) may receive a user input indicating the threshold. In a particular implementation, the ISP 110 may generate the second image frame 206 by copying the first image frame 204 and reducing a resolution of the copied image frame. In an alternative implementation, the ISP 110 may generate the second image frame 206 by copying another image frame of the image frames 202 and reducing a resolution of the copied image frame. The first image frame 204 may have a first size (e.g., greater than 10 megabytes (MBs)). The second image frame 206 may have a second size that is less than half of the first size.

The ISP 110 may process the image frames 202 and may provide ISP statistics (e.g., information regarding color, focus, zoom, and/or light) to the trigger detector 215. The video buffer 120*b* may provide the second image frames to the video encoder 125*b*. The video encoder 125*b* may encode the second image frames to generate a compressed bit-stream. The video encoder 125*b* may divide each image frame into a particular number of macro-blocks (MBs) and may generate macro-block (MB) statistics of each MB. The MB statistics may indicate an MB mode of a corresponding MB. For example, the MB statistics may indicate whether the corresponding MB is coded as an intra-MB or an inter-MB. The MB statistics may include motion data (e.g., a motion vector), texture data, and/or complexity data (e.g., a measure of spatial activity). The video encoder 125*b* may provide video statistics (e.g., the MB statistics) to the trigger detector 215.

The audio sensor 210 may receive audio data corresponding to the image frames 202. For example, the audio data may be captured by the audio sensor 210 at approximately the same time as the image frames 202 are captured by the imaging system 105. An audio sample rate (e.g., 13 kilo hertz (kHz)) of the audio sensor 210 may be higher than a video sample rate (e.g., 30 hertz (Hz)) of the imaging system 105. The audio signal processor 208 may receive audio samples at the audio sample rate from the audio sensor 210. The audio signal processor 208 may estimate signal energy over a period (e.g., 33 milliseconds) corresponding to a frame interval (e.g., 30 Hz). The audio signal processor 208 may provide signal energy data indicating the estimated signal energy to the trigger detector 215. The signal energy data may correspond to the first image frame 204 and the second image frame 206. For example, the signal energy data may be associated with a second timestamp indicating a time of capture of a portion of the audio signal that corresponds to the signal energy data. The second timestamp may be within a threshold duration of the timestamp of the first image frame 204 and of the second image frame 206.

The trigger detector 215 may detect a trigger (or designate the second image frame 206 as an action frame) by analyzing the second image frame 206 based on the ISP statistics received from the ISP 110, the video statistics (e.g., MB statistics) received from the video encoder 125*b*, audio data received from the audio signal processor 208, or a combination thereof, as described herein. For example, the audio data may indicate a characteristic (e.g., the signal energy data) of the audio samples. The trigger detector 215 may update a trigger detection threshold based on the characteristic of the audio samples, as described with reference to FIG. 24. The trigger detector 215 may detect the trigger in response to determining that motion data associated with the second image frame 206 satisfies a threshold value (e.g., the trigger detection threshold), as described with reference to FIGS. 3-4, 13-14, 17, and 24.

The trigger detector 215 may divide a region of interest of the particular image frame into a particular number of regions (e.g., rectangular regions) of MBs. The trigger detector 215 may generate cumulative statistics (e.g., a region intra MB fraction or a region motion metric) for each of the rectangular regions, as described with reference to FIGS. 3-4. The trigger detector 215 may detect the trigger in response to determining that a cumulative statistic (e.g., the highest cumulative mode statistic or the variance of the cumulative motion vectors) satisfies a cumulative statistic threshold, as described with reference to FIGS. 3-4.

Larger objects tend to move relatively slowly as compared to smaller objects. A small object motion detection algorithm (e.g., a micro-kernel algorithm) may be used to perform motion detection of small objects, as described with reference to FIG. 13. A large object motion detection algorithm (e.g., connected component analysis (CCA)) may be used to perform motion detection of large objects, as described with reference to FIG. 14. The trigger detector 215 may detect the trigger in response to determining that motion data satisfies a threshold, as described with reference to FIGS. 13-14.

The trigger detector 215 may designate one or more image frames (e.g., the first image frame 204) as an action frame in response to detecting the trigger. For example, the trigger detector 215 may provide a trigger notification to the JPEG compression engine 125*a*. The trigger notification may indicate the timestamp of the second image frame 206. The JPEG compression engine 125*a* may retrieve the one or more image frames (e.g., the first image frame 204) from the ZSL picture buffer 120*a* in response to receiving the trigger notification from the trigger detector 215. For example, the JPEG compression engine 125*a* may determine a first time indicated by a first timestamp of a first image frame (e.g., the first image frame 204) of the one or more image frames. The JPEG compression engine 125*a* may also determine a second time indicated by a second timestamp of a second image frame (e.g., the second image frame 206*a*). The second timestamp, the second image frame, or both, may be indicated by the trigger notification. The JPEG compression engine 125*a* may retrieve the first image frame in response to determining that a difference between the first time and the second time satisfies a threshold. To illustrate, the JPEG compression engine 125*a* may retrieve the one or more image frames that were captured within a particular duration of the second time at which the second image frame 206 (or a corresponding high resolution image frame) was captured by the imaging system 105. The JPEG compression engine 125*a* may compress the one or more image frames (e.g., the first image frame 204). The JPEG compression engine 125*a* may store the one or more compressed image frames (e.g., the compressed first image frame 204) in the SD card 135. In a particular implementation, the JPEG compression engine 125a may copy the one or more image frames (e.g., the first image frame 204) from the ZSL picture buffer 120a, may compress the copied image frames, and may store the compressed image frames (or the copied image frames) to the SD card 135 in response to determining that the one or more image frames are (e.g., the first image frame 204 is) designated as action frames by the trigger detector 215.

The device 200 of FIG. 2 may thus enable detection of action frames of a plurality of image frames based on external data (e.g., audio data). For example, conditions for trigger detection in a particular frame may be less stringent (e.g., have a lower threshold) when the corresponding audio data indicates a particular characteristic (e.g., a sudden change in volume). Trigger detection may be more robust when multiple sources of information (e.g., image data and audio data) are used to detect triggers.

Figure 3:
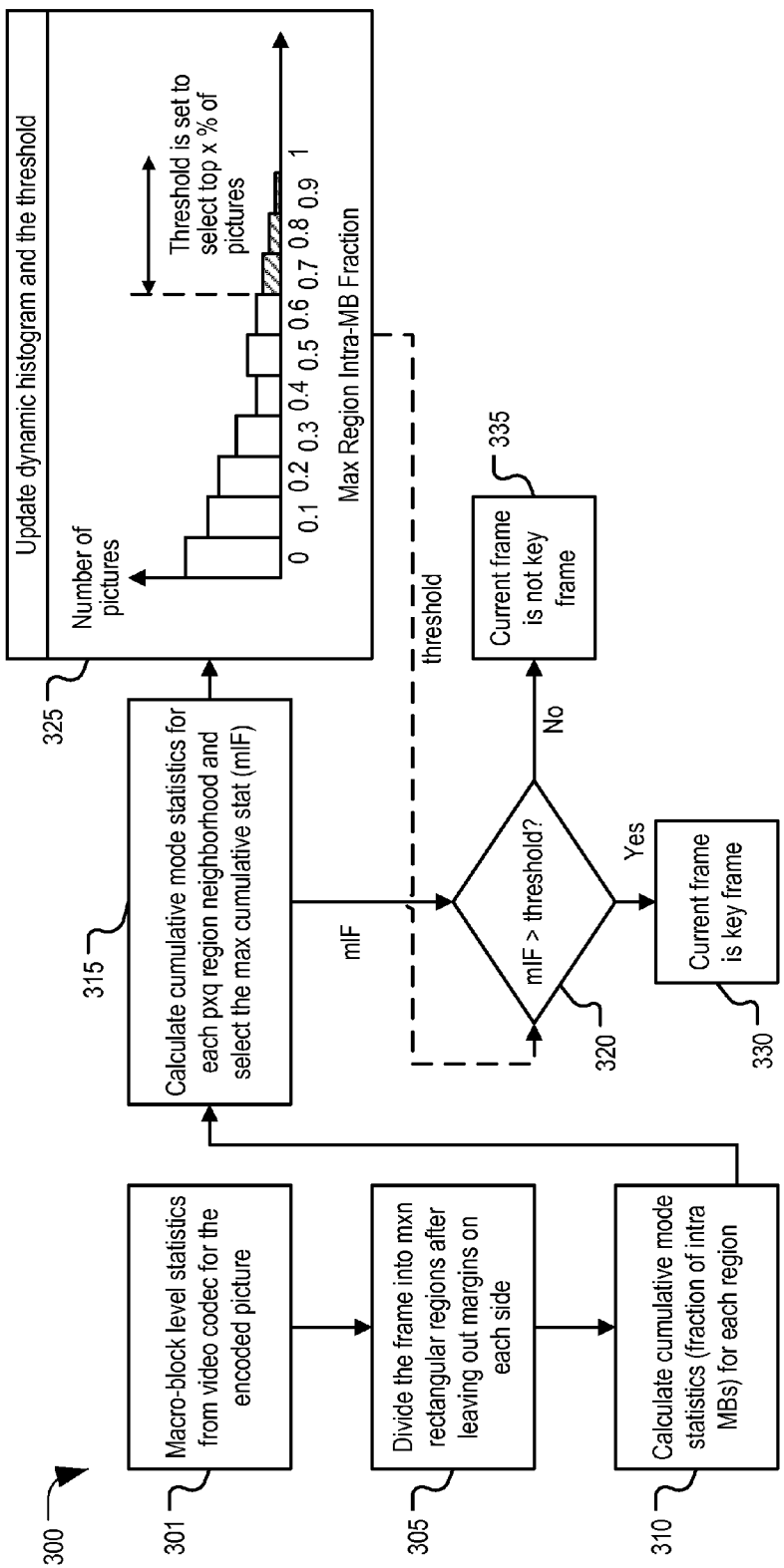
FIG. 3 is a flowchart of a method for determining if a captured image contains a moment of action.

FIG. 3 illustrates a flowchart of a particular method 300 for determining if a captured frame contains a "moment of action" (e.g., a sudden change in image content) using intra macro-block (MB) fraction statistics. As with the method of FIG. 4 below, any one of the ISP 110, the video encoder 125b, the processor 115, or the trigger detector 215 may perform the steps of FIG. 3 to determine a moment of action using the method of FIG. 3, which may be similar to the method of FIG. 4 discussed below.

At block 301, the Macro-block statistics from the video encoder 125b are received for the encoded picture (e.g., the second image frame 206 of FIG. 2). At block 305, after receiving the macro-block statistics for the frame (e.g., the second image frame 206), the received frame (e.g., the second image frame 206) may be divided into a number of rectangular regions, leaving margins on each side of the image. The margins may be established so as to better isolate the area of importance in the frame being analyzed (e.g., the second image frame 206) from potential movement and/or actions occurring closer to an edge of the frame being analyzed (e.g., the second image frame 206), where the movement and/or actions at the edge of the frame are not intended to be captured by the imaging equipment. The frame (e.g., the second image frame 206) may be divided into an M×N number of rectangular regions of macro-blocks (MBs), wherein there are M columns of rectangles across the frame and N rows of rectangles up and down the frame. Then, at block 310, the cumulative mode statistics (e.g., fraction of intra-MBs) may be calculated for each of the rectangular regions. For example, the MB statistics may indicate whether a particular MB is coded as inter-MB or intra-MB. A particular region may include a first number (e.g., M×N) of MBs. The MB statistics may indicate that a second number of MBs of the particular region are coded as intra-MB. A region intra MB fraction of the particular region may be determined based on the first number of MBs and the second number of MBs. For example, the region intra MB fraction may correspond to a ratio of the first number of MBs and the second number of MBs.

The video encoder 125b may determine a first number of MBs that are coded as intra-MB. The video encoder 125b may generate an intra MB fraction based the particular number of MBs and the first number of MBs. For example, the intra MB fraction may correspond to a ratio of the first number of MBs and the particular number of MBs.

Block 315 may calculate the cumulative mode statistics for groups (e.g., neighborhoods) of rectangular regions. The neighborhoods of rectangular regions may be a set of one or more adjacent rectangular regions (e.g., 2×2 regions). In some implementations, the neighborhoods of rectangular regions may be defined by P×Q number of neighborhoods.

Figure 7:
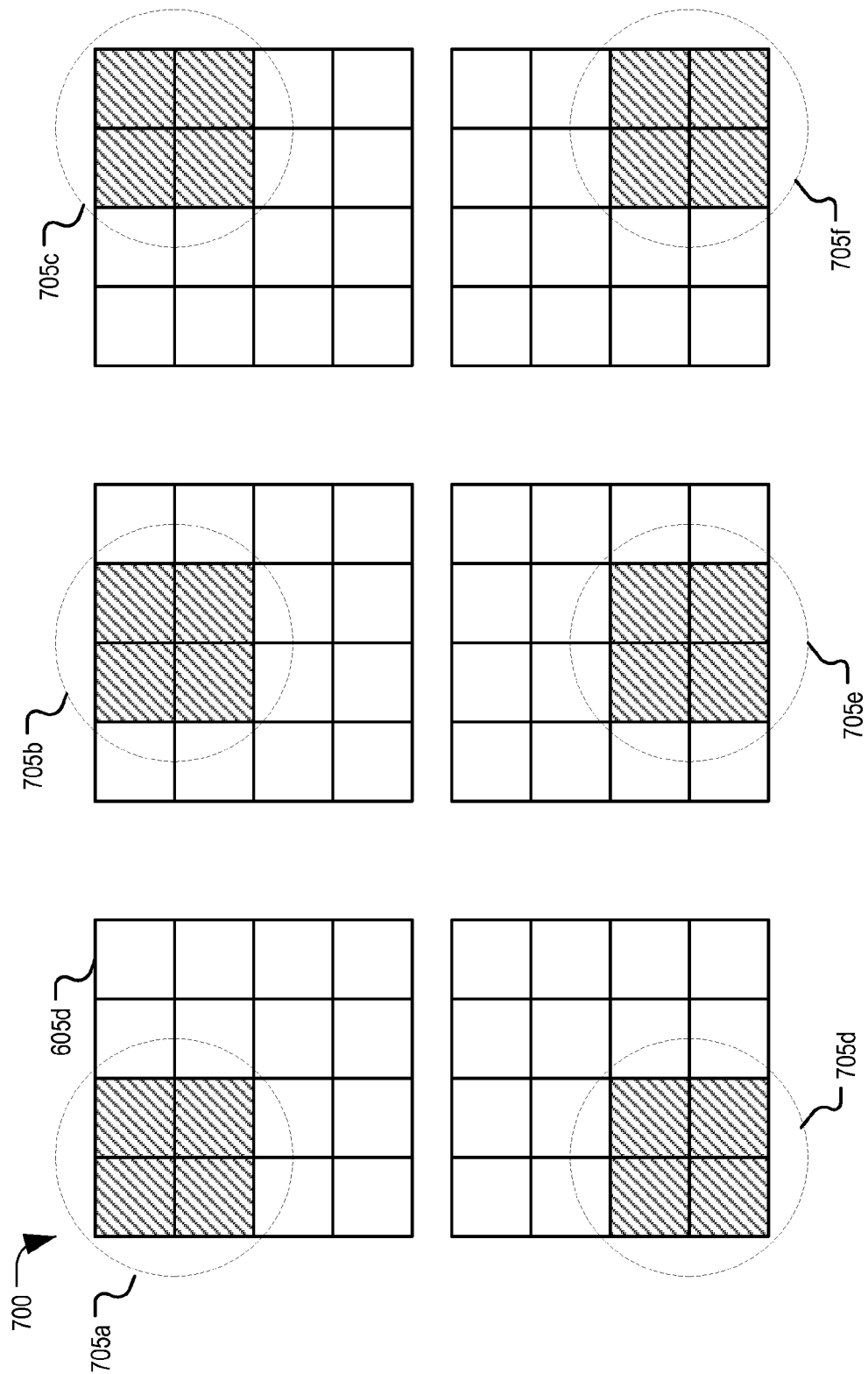
FIG. 7 illustrates an example of FIG. 6 where subsets of regions are indicated as neighborhoods.

FIG. 7 will discuss the neighborhoods in further detail below. A cumulative intra MB fraction of a particular neighborhood of first regions may be determined by summing or averaging region intra MB fractions of the first regions.

After calculating the cumulative mode statistics for each neighborhood, block 315 may select the maximum neighborhood or rectangular region cumulative statistic fraction of intra macro-blocks for the frame (e.g., the second image frame 206). For example, a particular area (e.g., a region or a neighborhood) may be determined to have a highest cumulative mode statistic (e.g., a maximum cumulative intra MB fraction (mIF)).

A non-limiting advantage of the cumulative statistics may be that when a single object or a set of objects are spatially together and when coherent movement spans across the boundaries of individual region from the original M×N division, the cumulative statistics may provide for better identification of moments of action. The highest cumulative mode statistic (e.g., the maximum cumulative intra MB fraction (mIF)) is then compared to a threshold value at block 320, the threshold value being determined by a dynamic histogram and threshold determining element at block 325. For example, the dynamic histogram may indicate how many of a first number (e.g., 100) of preceding image frames correspond to various values of a cumulative statistic.

At block 325, the threshold may be determined by selecting a maximum region intra-MB fraction that is met by a small percentage of frames. For example, the particular threshold may be selected so that cumulative statistics of a second number (e.g., 20 or 20%) of the preceding image frames satisfy the cumulative statistic threshold. The threshold may indicate the minimum value of the cumulative statistic (e.g., the mIF) corresponding to a "moment of action" frame. In some implementations, the threshold level may be established by indicating that a given percentage of frames are to be below the threshold, and the threshold may dynamically update as more statistics are added to the dynamic histogram based on the received statistics. For example, the dynamic histogram may be updated based on the cumulative statistic (e.g., the highest cumulative mode statistic) of the second image frame 206. In an alternate implementation, the threshold may be established by the user and may not be dynamically updated without user interaction. In some other implementations, the threshold may be established by indicating that a given number of frames are to be above the threshold.

At block 320, when the mIF is compared to the threshold value for a moment of action frame, if the mIF is greater than the threshold, then the current frame is determined to be a "key" frame or a frame containing a moment of action. The designation of the current frame as a key frame occurs at block 330. If the mIF for the current frame is not greater than the threshold mIF value, then the current frame is not a key frame and does not containing a moment of action. The designation of the current frame as a key frame occurs at block 330. After one of these two determinations is made, the method ends if this frame (e.g., the second image frame 206) is the last frame to be analyzed or repeats from block 305 if another frame to be analyzed exists.

Figure 4:
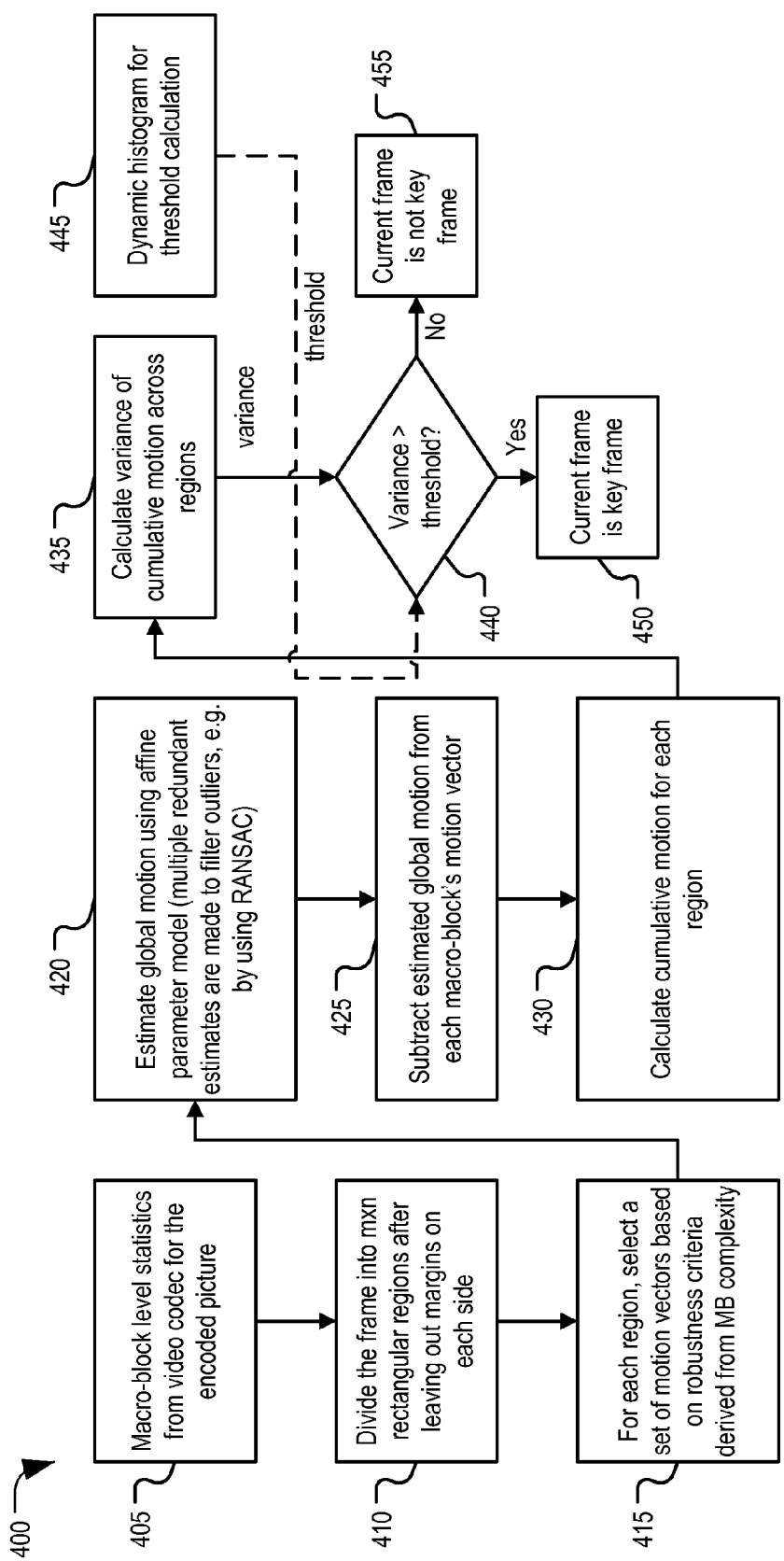
FIG. 4 is a flowchart of a method for determining if a captured video contains a moment of action.

FIG. 4 illustrates a flowchart of a particular method 400 for determining if a captured frame contains a moment of action using motion vectors. As with the method of FIG. 3, any one of the ISP 110, the video coder 125b, the processor 115, or the trigger detector 215 may perform the steps of FIG. 4 to determine a moment of action using the method of FIG. 4, which may be similar to the method of FIG. 3 discussed above.

The method 400 may begin with Block 405, where the macro-block level statistics and/or data for the encoded video clip for the video clip are received from the video codec. Then, at Block 410, each frame of the encoded video may be divided into M×N rectangular regions of MBs after leaving margins on each side of the frame (e.g., the second image frame 206). The margins may be established so as to better isolate the area of importance in the frame being analyzed from potential movement and/or actions occurring closer to an edge of the frame being analyzed. For each divided region, at Block 415, a subset of motion vectors is then selected based on robustness criteria derived from complexity data of the MBs. A region motion metric may be determined by summing or averaging the subset of motion vectors.

Then, Block 420 of the method estimates global motion for the entire frame using an affine parameter model (multiple redundant estimates are made to filter outliers using a "Random Sample Consensus" (RANSAC) or a similar filtering process. At Block 425, the estimated global motion values are subtracted from each region's macro-block motion vector, and the result is used to calculate a cumulative motion for each rectangular region at Block 430. For example, the estimated global motion values may be subtracted from a region motion metric of a particular region to determine a cumulative motion vector of the particular region. Next, at Block 435, the method calculates a variance of cumulative motion across the various rectangular regions of each frame. For example, a variance of cumulative motion vectors of the regions may be determined. The calculated variance is sent to Block 440 to be compared with a threshold value. For example, the variance of the cumulative motion vectors may be compared with a cumulative statistic threshold. At Block 445, a dynamic histogram may be updated based on the variance of cumulative motion vectors. A new threshold value (e.g., the cumulative statistic threshold) may be determined based on the dynamic histogram.

The dynamic histogram of Block 445 operates similarly to that described in relation to the "SmartSnap" image selection method, wherein in some implementations, the threshold may be determined by the method or the user. The dynamic histogram of Block 445 may operate similarly to the dynamic histogram described with reference to FIG. 3. Block 440 compares the calculated variance with the calculated threshold value from the dynamic histogram of Block 445. In Block 440, if the calculated variance of the current frame is above the threshold, then the frame being analyzed may be a "key" frame as indicated at Block 450. For example, a trigger may be detected in response to determining that the variance of cumulative motion vectors satisfies the cumulative statistic threshold. If the variance of the current frame is below the threshold, then the current frame may not be a "key" frame at Block 455. As discussed above, a "key" frame may be a frame containing a "moment of action." Thus, the motion vector and variance of each of the rectangular regions may be considered to indicate action in each of the respective regions of the frame. After determinations is made at block 440, the method 400 ends if this frame (e.g., the second image frame 206) is the last frame to be analyzed or repeats from block 405 if another frame to be analyzed exists.

FIGS. 13-14, 18-19, and 23-25 illustrate other particular examples of methods for determining if a captured frame contains a moment of action. In the particular example illustrated by FIGS. 13, 14, and 23, motion detection for large objects and motion detection for small objects may be performed separately. For example, a small object motion detection algorithm illustrated in FIG. 13 may perform motion detection using a micro-kernel (e.g., a small neighborhood of macro-blocks). A large object motion detection algorithm illustrated in FIG. 14 may perform motion detection using connected component analysis (CCA). Dividing motion detection for small objects and large objects may improve motion detection since large objects may tend to move relatively slowly as compared to small objects. A trigger detection algorithm illustrated in FIG. 23 may detect a trigger based on the motion detection for large objects, the motion detection for small objects, or both.

Figure 13:
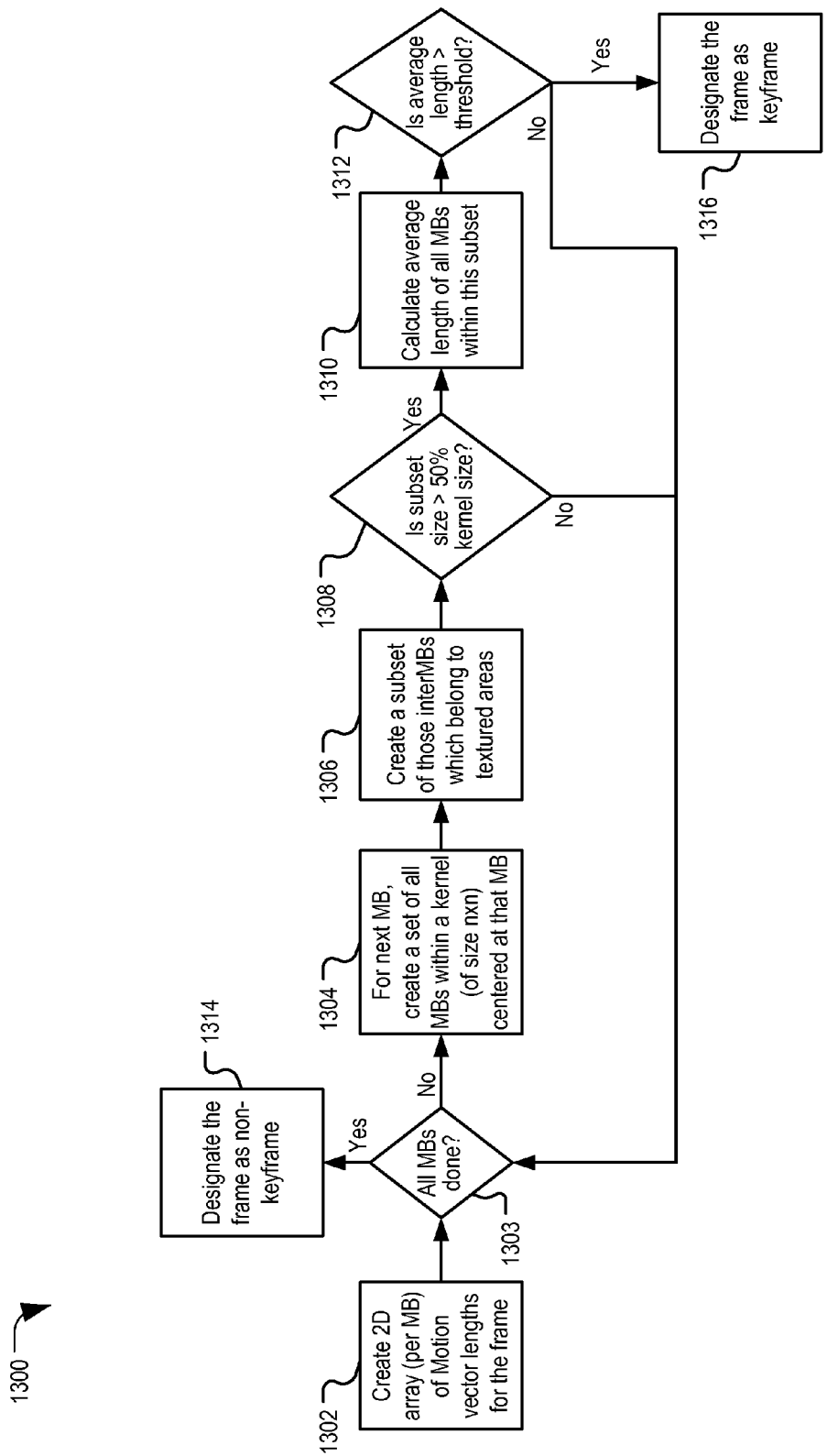
FIG. 13 is a diagram of a particular example of a method for determining if a captured frame contains a moment of action.

Referring to FIG. 13, a method of operation is shown and generally designated 1300. The method 1300 may be performed by the processor 115 of FIG. 1, the trigger detector 215 of FIG. 2, or both.

The method 1300 includes creating a 2-dimensional (2D) array (per macro-block (MB)) of motion vector lengths for the frame, at 1302. For example, the processor 115 of FIG. 1 may generate a 2D array of motion vector lengths for the second image frame 206 of FIG. 2. For example, each entry in the 2D array may represent a particular motion vector length of a corresponding MB of the second image frame 206.

The method 1300 further includes determining whether all MBs have been analyzed, at 1303. For example, the processor 115 of FIG. 1 may determine whether each MB of the second image frame 206 has been analyzed. The method 1300 may proceed to 1314 in response to determining, at 1303, that all MBs have been analyzed. The method 1300 may, alternatively, proceed to 1304 in response to determining, at 1303, that fewer than all MBs have been analyzed.

The method 1300 also includes, for a next MB, creating a set of all MBs within a kernel (of size N×N) centered at that MB, at 1304. For example, the processor 115 of FIG. 1 may, for a next MB of the second image frame 206 that is to be analyzed, determine a set of MBs within a particular area (e.g., a kernel) centered at the MB. The kernel may have a particular size (e.g., 3×3).

The method 1300 further includes creating a subset of inter MBs which belong to textured areas, at 1306. For example, the processor 115 of FIG. 1 may determine a particular subset of MBs for the set of MBs. The processor 115 may determine that a particular MB of the set of MBs is to be included in the particular subset of MBs in response to determining that texture data of the particular MB indicates that the particular MB is textured.

The method 1300 also includes determining whether the subset size is greater than half of a size of a kernel, at 1308. For example, the processor 115 of FIG. 1 may determine whether a size of (e.g., a number of first MBs included in) the particular subset satisfies (e.g., is greater than) a subset size threshold (e.g., half of a size of the kernel, or 4.5).

The method 1300 further includes, in response to determining, at 1308, that the size of the particular subset satisfies the subset size threshold, calculating an average motion vector length of all MBs within the particular subset, at 1310. For example, the processor 115 of FIG. 1 may determine an average motion vector length of MBs of the particular subset in response to determining that the size of the particular subset satisfies the subset size threshold.

The method 1300 also includes determining whether the average motion vector length is greater than a threshold value, at 1312. For example, the processor 115 of FIG. 1 may determine whether the average motion vector length of all MBs of the particular subset satisfies (e.g., is greater than) a threshold value (e.g., a subset motion vector threshold).

The method 1300 includes, in response to determining, at 1312, that the average motion vector length satisfies (e.g., is greater than) the threshold value, designating the frame as a key frame, at 1316. For example, the processor 115 of FIG. 1 may designate the second image frame 206 as a key frame in response to determining that the average motion vector length satisfies the subset motion vector threshold. The processor 115 may detect a trigger in the second image frame 206 in response to determining that the average motion vector length satisfies the subset motion vector threshold. The processor 115 may, in response to detecting the trigger, designate the second image frame 206 as a key frame (e.g., an action frame) by generating a trigger notification indicating the second image frame 206. For example, the trigger notification may include a timestamp corresponding to the second image frame 206.

The method 1300 also includes, in response to determining that the size of the particular subset is less than or equal to half of the size of a kernel, at 1308, or that the average motion vector length fails to satisfy (e.g., is less than or equal to) the threshold value, at 1312, returning to 1303 to determine whether all MBs have been analyzed. For example, the processor 115 of FIG. 1 may analyze a next subset corresponding to another MB of the second image frame 206 of FIG. 2 in response to determining that the size of the particular subset fails to satisfy the subset size threshold or that the average motion vector length fails to satisfy the subset motion vector threshold. If there are no more MBs to be processed, the processor 115 may designate the second image frame 206 as a non-key frame (e.g., not an action frame) or use another algorithm to analyze the second image frame 206. For example, the processor 115 may designate the second image frame 206 as a non-key frame in response to determining that, for each MB, either a size of a corresponding subset for the MB is less than or equal to half of the size of a kernel, or that a corresponding motion vector length for the MB is less than or equal to the threshold value. To illustrate, the processor 115 may designate the second image frame 206 as a non-key frame in response to determining that, for all MBs, a size of a corresponding subset of inter MBs which belong to textured areas is less than or equal to half of the size of a kernel. The processor 115 may designate the second image frame 206 as a non-key frame in response to determining that, for all MBs, a corresponding motion vector length is less than or equal to the threshold value. The processor 115 may designate the second image frame 206 as a non-key frame in response to determining that, for some MBs, a size of a corresponding subset of inter MBs which belong to textured areas is less than or equal to half of the size of a kernel and that, for the remaining MBs, a corresponding motion vector length is less than or equal to the threshold value. In a particular implementation, the processor 115 may refrain from detecting a trigger in the second image frame 206 in response to determining that the second image frame 206 is a non-key frame.

The method 1300 may be used to perform motion detection using a micro-kernel (e.g., a small neighborhood of macro-blocks). Using a micro-kernel may enable motion detection of small objects. The method 1300 may be used to identify an image frame corresponding to a dynamic event that includes motion associated with small objects.

Figure 14:
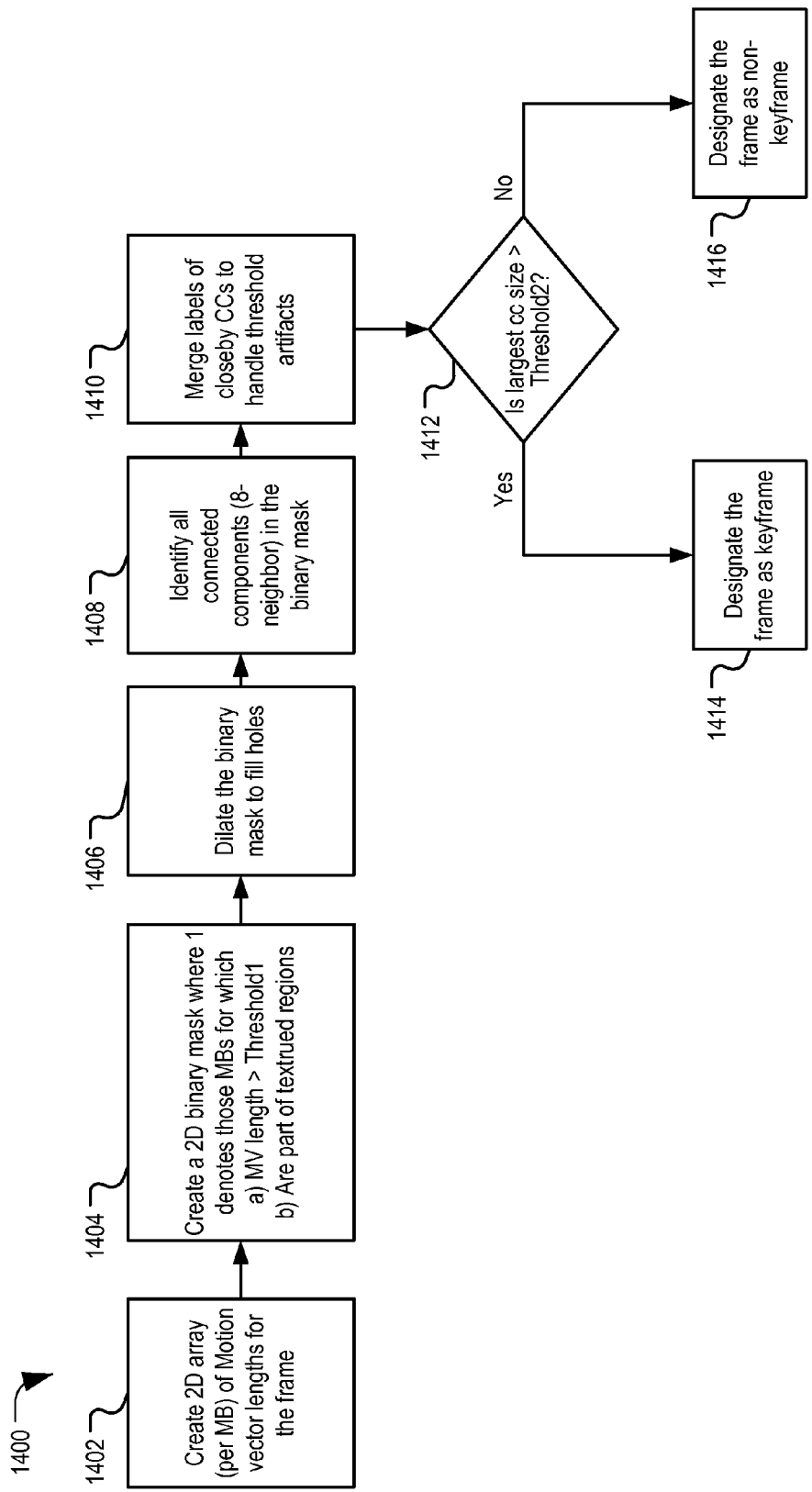
FIG. 14 is a diagram of another example of a method for determining if a captured frame contains a moment of action.

Referring to FIG. 14, a method of operation is shown and generally designated 1400. The method 1400 may be performed by the processor 115 of FIG. 1, the trigger detector 215 of FIG. 2, or both.

The method 1400 includes creating a 2D array (per MB) of motion vector lengths for a frame, at 1402. For example, the processor 115 of FIG. 1 may generate a 2D array of motion vector lengths for the second image frame 206 of FIG. 2. For example, each entry in the 2D array may represent a particular motion vector length of a corresponding MB of the second image frame 206.

The method 1400 also includes creating a 2D binary mask where 1 denotes those MBs for which 1) a motion vector length of the MB is greater than a threshold value, and 2) the MB is part of a textured region, at 1404. For example, the processor 115 of FIG. 1 may generate a 2D binary mask (e.g., a bitmap). A particular bit of the bitmap may correspond to a particular MB of the second image frame 206 of FIG. 1. The processor 115 may, for each MB, set a corresponding bit to a first value (e.g., 1) in response to determining that a motion vector length of the MB satisfies a threshold value (e.g., an MB motion vector threshold) and that texture data of the MB indicates that the MB is textured.

The method 1400 further includes dilating the binary mask to fill holes, at 1406. For example, the processor 115 of FIG. 1 may set remaining bits of the bitmap to a second value (e.g., 0).

The method 1400 also includes identifying all connected components (8-neighbor) in the binary mask, at 1408. For example, the processor 115 of FIG. 1 may identify one or more sets of connected components (e.g., bits) in the bitmap. To illustrate, a particular bit having the first value (e.g., 1) may be connected to a neighboring bit having the first value. A neighboring bit may share an edge or corner of the bitmap with the particular bit. The processor 115 may identify sets of neighboring bits that have the first value (e.g., 1).

The method 1400 further includes merging labels of close by connected components to handle threshold artifacts, at 1410. For example, the processor 115 of FIG. 1 may merge two or more sets of connected components that are proximate (e.g., within a particular number (e.g., 2) of rows or columns of the bitmap) to each other.

The method 1400 also includes determining whether a connected component size of a largest set of connected components is greater than a particular threshold value, at 1412. For example, the processor 115 of FIG. 1 may determine a connected component size of a largest set of connected components. The processor 115 may determine whether the connected component size satisfies (e.g., is greater than) a particular threshold value (e.g., a connected component threshold).

The method 1400 further includes, in response to determining that the connected component size satisfies the connected component threshold, at 1412, designating the frame as a key frame, at 1414. For example, the processor 115 of FIG. 1 may designate the second image frame 206 as a key frame (e.g., an action frame) in response to determining that the connected component size satisfies the connected component threshold. The processor 115 may detect a trigger in the second image frame 206 in response to determining that the connected component size satisfies the connected component threshold. The processor 115 may, in response to detecting the trigger, designate the second image frame 206 as a key frame (e.g., an action frame) by generating a trigger notification indicating the second image frame 206. For example, the trigger notification may include a timestamp corresponding to the second image frame 206.

The method 1400 also includes, in response to determining that the connected component size fails to satisfy the connected component threshold, at 1412, designating the frame as a non-key frame, at 1416. For example, the processor 115 may determine that the second image frame 206 is a non-key frame (e.g., not an action frame) or use another algorithm (e.g., the method 1300 of FIG. 13) to process the second image frame 206 in response to determining that the connected component size fails to satisfy the connected component threshold.

In a particular implementation, the processor 115 may refrain from detecting a trigger in the second image frame 206 in response to determining that the second image frame 206 is a non-key frame. The processor 115 may, in response to determining that the second image frame 206 is a non-key frame, generate a trigger notification indicating that the second image frame 206 is a non-key frame (e.g., not an action frame).

The method 1400 may be used to perform motion detection using connected component analysis (CCA). Using CCA may enable motion detection of large objects. The method 1400 may be used to identify an image frame corresponding to a dynamic event that includes motion associated with large objects. An algorithm, illustrated in FIG. 23, may use the method 1300 and the method 1400 for robust trigger detection.

Figure 18:
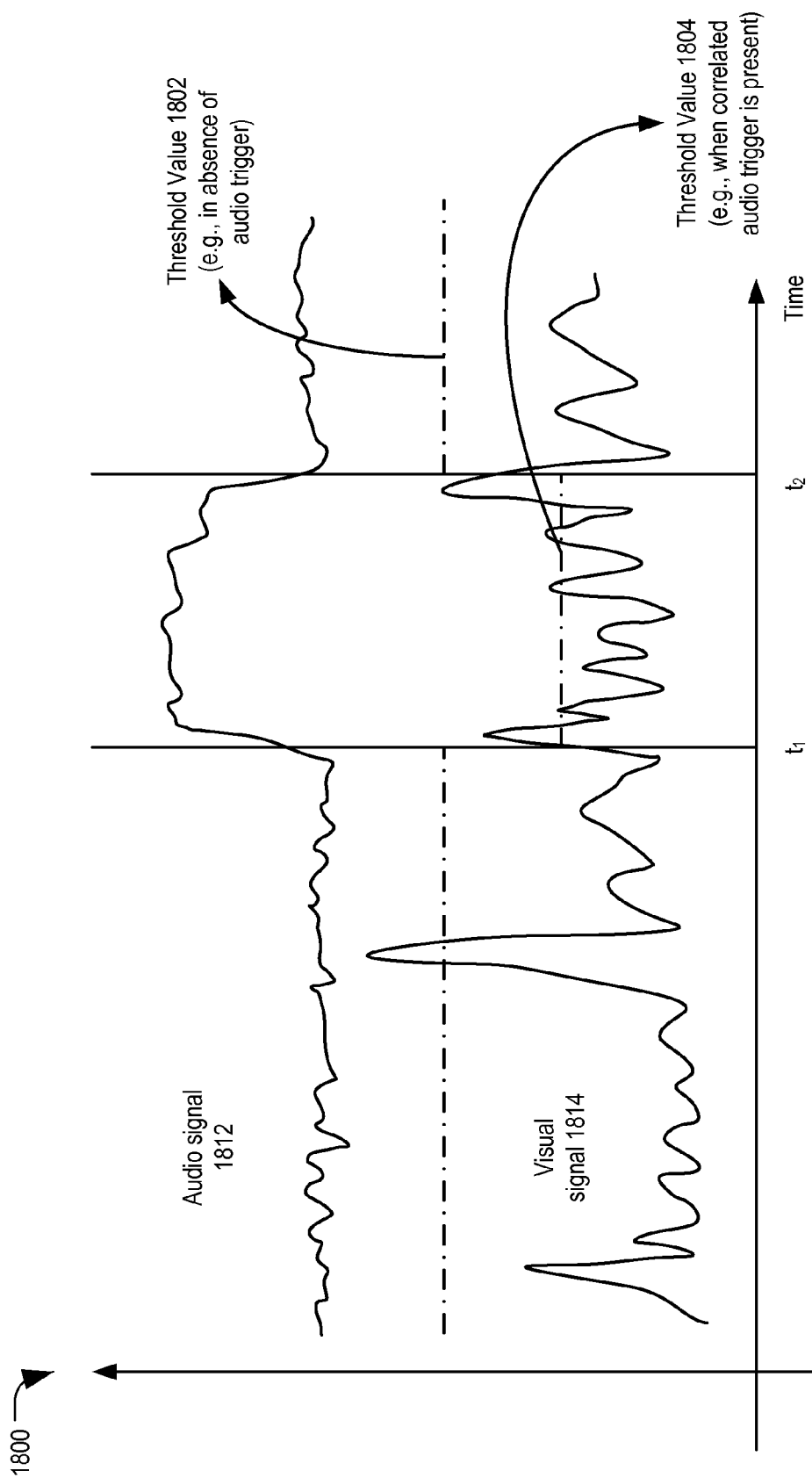
FIG. 18 is a diagram of an example of a method for determining if a captured frame contains a moment of action based on image data and non-image data (e.g., audio data)
Figure 19:
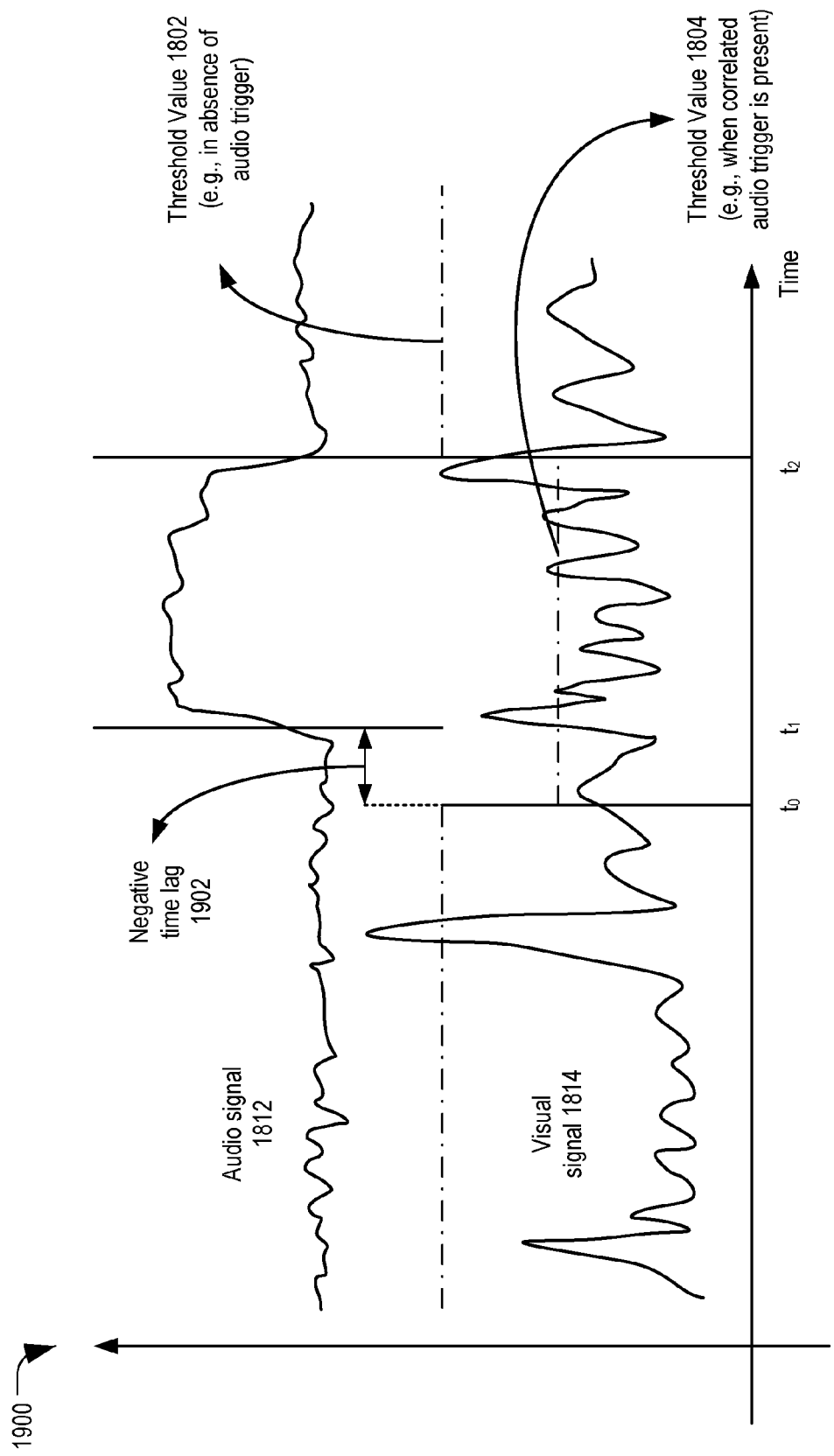
FIG. 19 is a diagram of another example of a method for determining if a captured frame contains a moment of action based on image data and non-image data (e.g., audio data)
Figure 24:
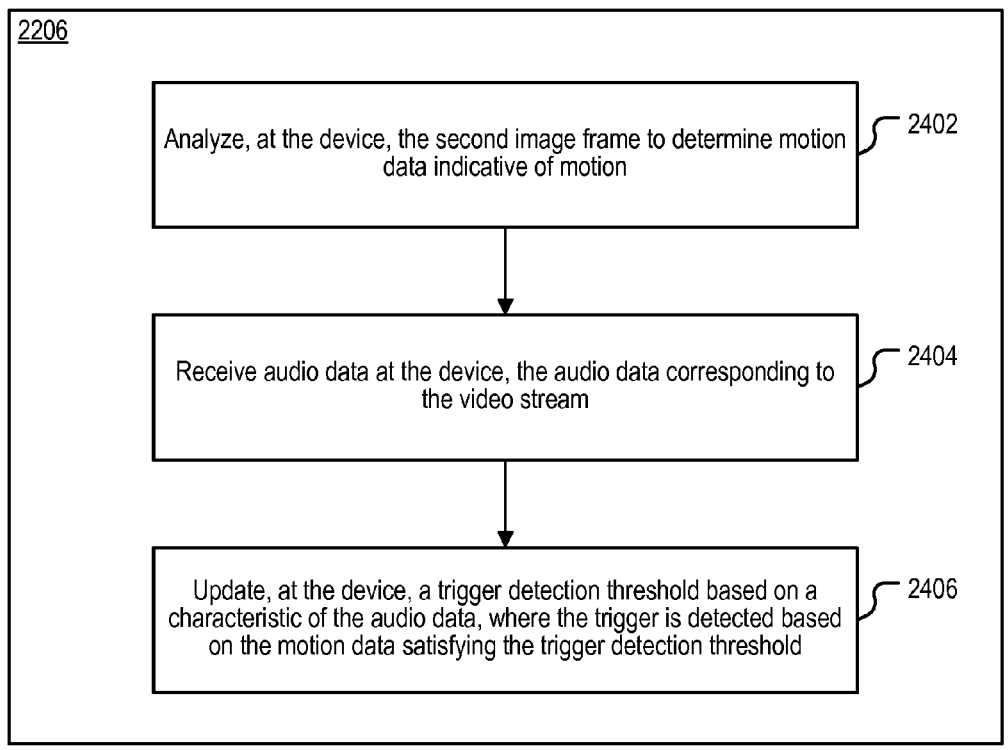
FIG. 24 is a flow chart of a method of operation at an electronic device of one or more of the systems disclosed herein.

FIGS. 18, 19, and 24 illustrates an example of a method for determining if a captured frame contains a moment of action based on image data and non-image data (e.g., audio data). As illustrated in FIG. 18, an audio signal 1812 may be captured along with a visual signal 1814 corresponding to image frames (e.g., the image frames 202 of FIG. 2). As described further herein, one or more threshold may be used to determine whether an image frame (e.g., the second image frame 206 of FIG. 2) is a key frame (e.g., based on motion detected based on two or more image frames). A particular threshold may be adjusted based on the audio signal 1812. For example, the particular threshold (illustrated by a dotted redline in FIG. 18) may have a first value (e.g., a threshold value 1802) at a first time, where the first time is associated with a portion of the audio signal 1812 that has particular characteristics (such as a particular volume, a particular rate of change of the volume, etc.). To illustrate, the audio signal 1812 may have the particular characteristics prior to a time t1 and subsequent to a time t2. The particular threshold may have the threshold value 1802 prior to the time t1 and subsequent to the time t2.

As another example, the particular threshold may have a second value (e.g., a threshold value 1804) at a second time, where the second time is associated with the audio signal 1812 having different characteristics (such as a different volume, a different rate of change of the volume, etc.). To illustrate, the particular threshold may have the threshold value 1804 between the time t1 and the time t2. As a specific example, the value of the particular threshold may be decreased (such that, for example, less motion will trigger designation of a key frame) when the audio signal 1812 changes suddenly. To illustrate, the audio signal 1812 may provide information about an event to be captured in an image frame when the user is photographing a sporting event, a fireworks display, or another activity that is associated with sudden loud sounds when key events occur.

As illustrated in FIG. 19, the particular threshold may have the second value (e.g., the threshold value 1804) earlier than the second time (e.g., the time t1 to the time t2). For example, the particular threshold may have the threshold value 1804 at a time t0 that is prior to the time t1. There may be a negative time lag 1902 in the adjustment of the particular threshold relative to the change in the audio signal 1812. For example, key events may begin prior to sudden loud sounds. Adjusting the particular threshold with the negative time lag 1902 may enable capture of the beginning of the key event.

As illustrated in FIG. 24 a trigger detection threshold may be updated based on a characteristic of audio data. For example, the trigger detection threshold may be decreased in response to determining that the audio data indicates that a volume level suddenly changes. The trigger detection threshold may include the threshold value compared to a highest cumulative mode statistic (e.g., the maximum cumulative intra MB fraction (mIF)) at block 320 of FIG. 3, the threshold value compared to the calculated variance at block 440 of FIG. 4, a threshold value compared to an average length at block 1312 of FIG. 13, a threshold value compared to motion vector lengths at block 1404 of FIG. 14, a threshold value compared to a largest connected component size at block 1412 of FIG. 14, a trigger detection threshold of the trigger combiner 1710 of FIG. 17, or a combination thereof.

Figure 5:
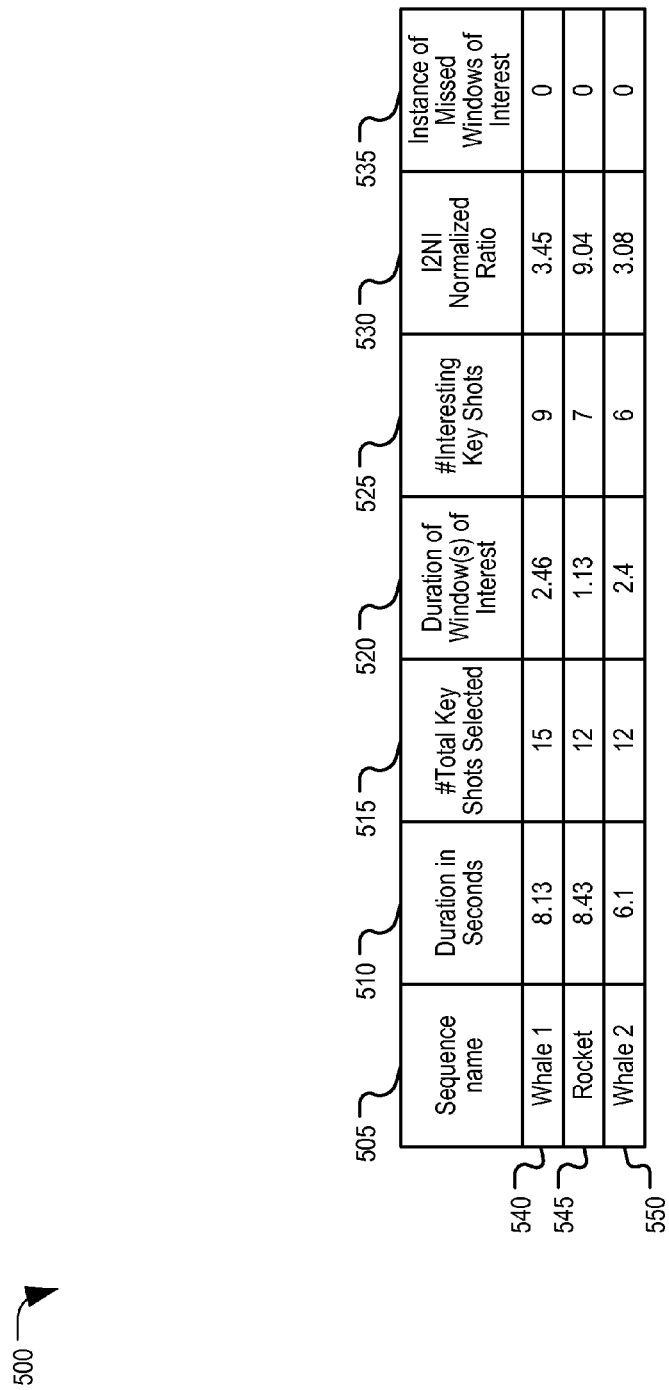
FIG. 5 represents a chart disclosing information regarding the analysis of three video frame sequences and details of the detected moments of action therein.

FIG. 5 discloses a table of information comprising various columns and rows disclosing information regarding the analysis of three video frame sequences and details of the detected moments of interest within the video frame sequences, and generally designated as Results Table 500.

The results table 500 provides information comparing exemplary video captures that each contain "moments of action" (i.e., moments of interest) and provide details regarding the captured video and the moments of action contained therein. A first column 505 includes the name of the captured video frame sequence. Column 510 may indicate the length (e.g., duration) of each of the video sequences in seconds. Column 515 may indicate the Number of Key Shots Selected in the captured video frame sequence. Column 520 discloses the duration of moments of action, in seconds, within each of the video frame sequences. Column 525 includes the number of interesting key shots in the video frame sequences. Column 530 contains the I2NI Normalized Ratio, while column 535 shows the number of Instances of Missed Windows of Interest. The I2NI normalized ratio may comprise a ratio of two densities, where the first density of the ratio is the temporal density of action pictures as captured by the SmartSnap method in the time windows where true action is taking place, and the second density of the ratio is the temporal density of action pictures captured by the SmartSnap method in the time windows where there is actually no motion (i.e., false triggers of action frames). Row 540 contains all the information corresponding to each of the columns identified above for the first video sequence, named "Whale1." Row 545 contains the corresponding information for the "Rocket" video sequence, and row 550 discloses the corresponding information for "Whale2."

As indicated in the results table 500, the automatic "moment of action" detection system was able to detect each of the instances of moments of action and was capable of detecting a moment of action that was substantially shorter than the entire video frame sequence. The results depicted in the results table 500 show that the proposed methods perform well in selecting moments of interest while rejecting frames that do not include moments of interest. Additionally, all temporal regions consisting of moments of action are well represented by the determined interesting key shots of column 525. The I2NI Normalized Ratio of Column 530 may vary dependent upon the background of the frame being analyzed. In frames with minimal disturbance or elements in the background, the I2NI normalized ratio may be higher than in frames with unstable backgrounds.

Figure 6:
FIG. 6 illustrates an example of the captured image or video frame being divided into a plurality of regions and having an intra fraction designated for each region therein.

Referring to FIG. 6, a captured image or video clip frame being analyzed and having been divided into a plurality of regions, each region having had its intra MB percentage designated therein is depicted and generally designated 5600. As discussed above, the frame (e.g., the second image frame 206) is divided into M×N plurality of rectangular regions 605a-605p. Each region is depicted with its intra MB percentage having been calculated. The intra MB percentages range from 0.0 (region 605m) the highest intra MB percentage for the frame at 0.7 (region 605g). Region 605g, having the highest intra MB percentage, is shaded to indicate such, as the highest intra-MB percentage of the frame is the intra-fraction compared with the threshold. In some implementations, one or more regions may share the highest intra MB percentage, and the fact that multiple regions share the high intra MB percentage may not affect the determination of whether or not the frame is a "key" frame. In another implementation, frames with multiple regions each sharing the highest intra MB percentage may be determined to be "non-key" frames.

Referring to FIG. 7, an example of FIG. 6 where subsets of rectangular regions are indicated as neighborhoods is illustrated and generally depicted 700. As discussed briefly above in relation to FIG. 3, in some implementations, the determination of a "key" frame may be based on a group, or neighborhood, of regions. Such implementations may account for moments of action that may span across multiple regions of the frame being analyzed. Accordingly, the M number of columns of regions and N number of rows of regions may be grouped into X by Y neighborhoods (P×Q in FIG. 3) of regions 605, where each neighborhood is a 2×2 block of regions 605. In other implementations, the neighborhood may comprise a 1×2 block of regions 605 or a block of regions 605 of any size less than the M×N division of regions 605. In such implementations, a calculated intra MB percentage for each neighborhood of regions may be assigned, with the maximum calculated intra MB percentage being used for comparison with the threshold IF for determination of "key" frames. FIG. 7 depicts an example of a frame being analyzed having been divided into a 4×4 grouping of regions 605, the regions 605 further grouped in 2×2 neighborhoods 705a-705f. FIG. 7 shows six of the nine possible 2×2 neighborhoods 705 that exist for the depicted frame regions 605.

Figure 8:
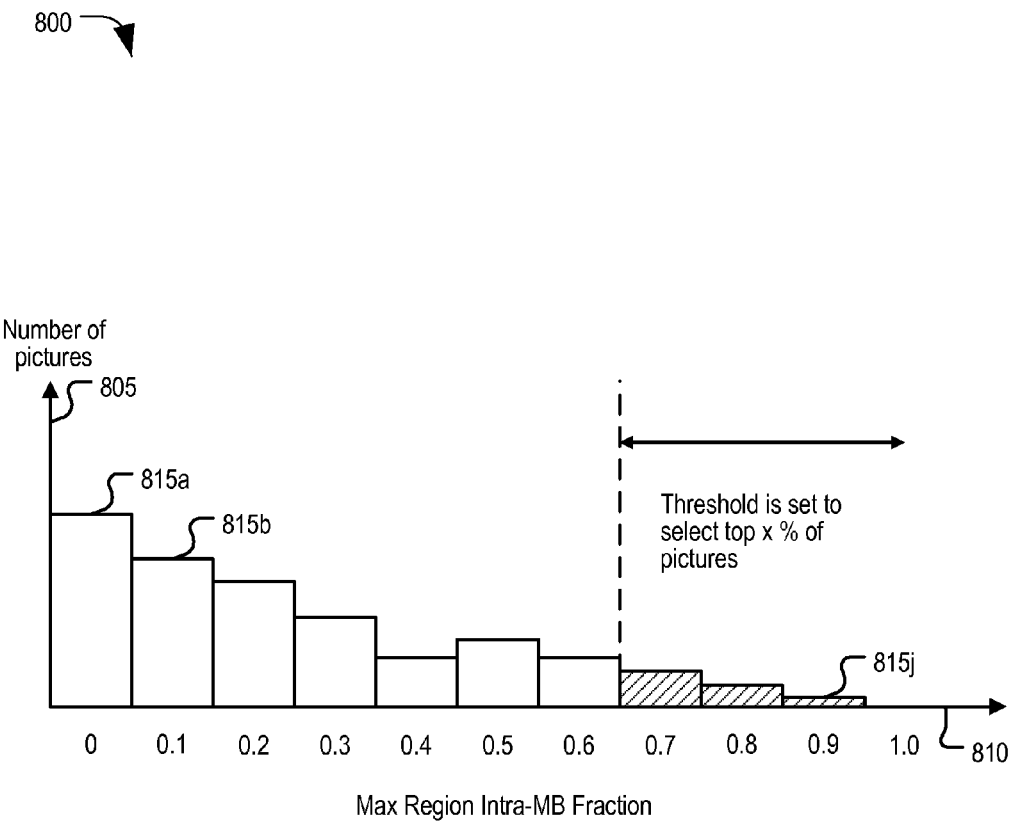
FIG. 8 illustrates a dynamic histogram used to determine the threshold above which a captured image or video frame is determined to contain a moment of action.

FIG. 8 illustrates an example of a dynamic histogram used to determine the threshold IF above which a captured image or video frame is determined to contain a moment of action and be a "key" frame, and is generally designated 800. The determination and selection of the threshold IF may be based on a dynamic histogram. As shown in FIG. 8, the y-axis 805 depicts a quantity of pictures, and the x-axis 810 comprises the maximum region intra-MB percentage. Various columns 815a-815j are shown depicting the number of frames previously analyzed that have a given maximum region intra-MB percentage. In some implementations, the dynamic histogram of intra-MB percentage scores may comprise the scores of the most recently analyzed hundred frames, and thus columns 815a-815j may update with each new frame analyzed. In some other implementations, the histogram may comprise the scores of the most recently analyzed X number of frames, where X may be any value as determined by the user or by the system.

In some implementations, the threshold may be set to identify a certain percentage of frames with the largest intra MB percentage or a specific number of frames with the largest intra MB percentage as containing moments of action. In some implementations, this percentage of frames or number of frames may dynamically change based on available storage medium (i.e., memory) or may be changed by the user.

Figure 9:
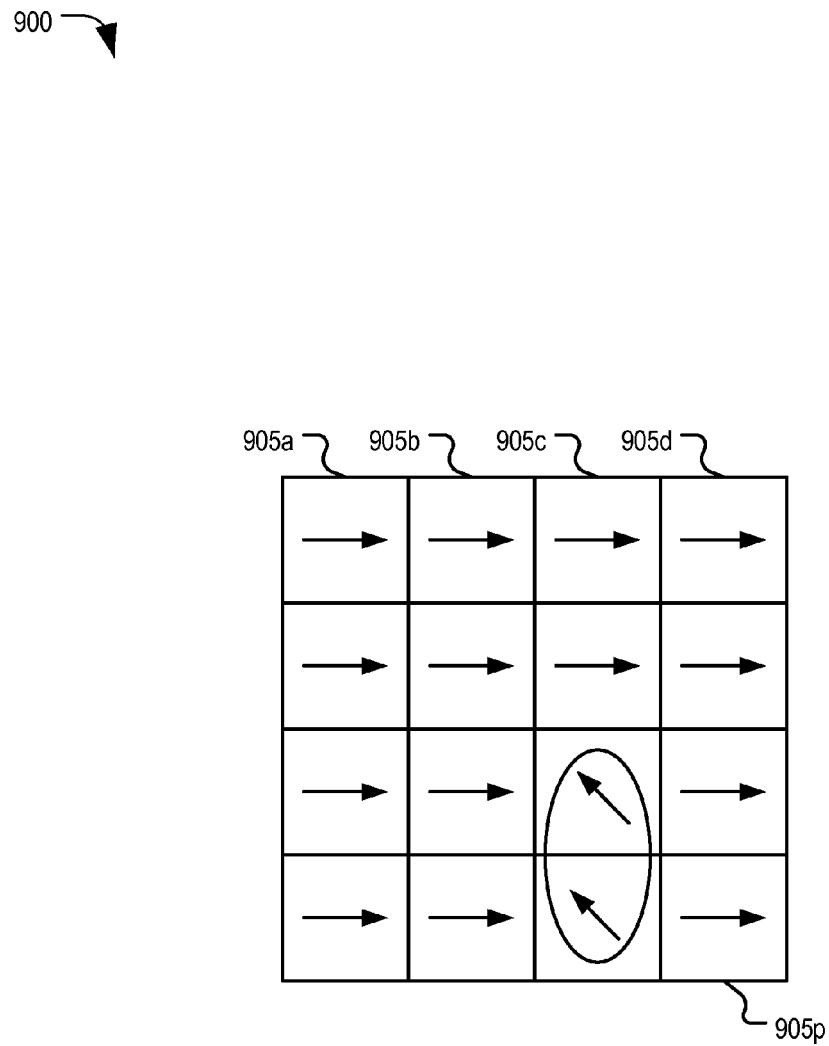
FIG. 9 is a diagram of an example of the captured image or video frame being divided into a plurality of regions, each region having the aggregate motion of the region depicted therein.

FIG. 9 illustrates an example of the captured image or video frame being divided into a plurality of regions, each region having the aggregate motion of the region depicted therein, and is generally designated 900. In a frame, motion of an object relative to other objects within the frame may indicate an action occurring within the frame, as seen by the method of FIG. 4. In some implementations, such an action may be a trigger for identification as a "key" frame. As discussed above, the frame being analyzed (e.g., the second image frame 206) may be divided into M×N regions 605; here, the frame is divided again into region 905a-905p, a 4×4 layout. Then, aggregate motion (RM) within each region 905 may be calculated and indicated therein, as shown by the arrows depicted in each region 905. Then, the variance in the aggregate motion within each region is compared with a threshold aggregate motion variance amount to determine if the frame should be selected as a "key" frame based on the aggregate motion. Similarly, as discussed above with the intra-MB percentage, the aggregate motion determination may also be based on neighborhood blocks of regions 905, where the calculated aggregate motion is of the neighborhood block as a whole and not of individual regions 905.

In some implementations, the use of motion vector information an aggregate motion calculations for each region or neighborhood of regions may need to compensate or account for global motion or motion that is affecting the entire frame, such as rotation or other non-translational motion, which may lead to large aggregate motion variance calculations for a picture where the scene is entirely static. For example, if the camera is being rotated clockwise at the time a frame is captured, there may be motion vectors on the right side of the frame pointing downward and motion vectors on the left side of the frame pointing upward, both of which may result in a large aggregate motion calculation. Thus, the potential for global motion needs to be able to be compensated for in the calculation of the aggregate motion to ensure true object motion and aggregate motion variance is being detected. To account for potential global motion, an affine parameter model is used to estimate and detect global motion and provide for its compensation in the aggregate motion variance calculation. After the global motion is compensated for, the variance is calculated based on the residual aggregate motion.

In some implementations of video frames, the reliability information received from the video codec may not be an accurate indicator of motion within the frame. For example, macro-blocks with edge-features may be identified using techniques such as structure tensor representation or partial derivatives and its eigenvalue analysis. Alternatively, in the absence of gradient information, information such as complexity measures may be used for macro-block selection. Then, RANSAC methods are used to filter out object motion from global macro-blocks.

Figure 10:
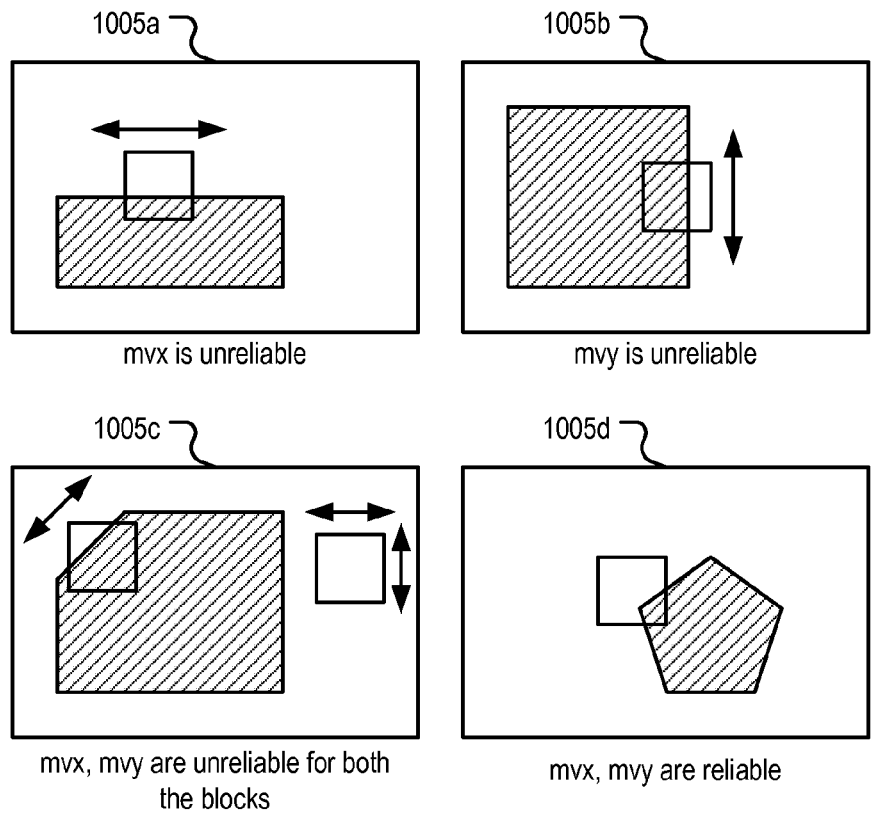
FIG. 10 depicts four examples of motion vector information for a captured image.

FIG. 10 depicts four examples of motion vector information for a captured image. In 1005, the non-rotational motion may be along the x-axis of the frame, and thus may compromise the reliability of the motion vector in the x-axis. In 1010, the non-rotation motion in the vertical direction may make the motion vector in the y-axis unreliable. Similarly, in 1015, the combination of motion in the x- and y-axis make the motion vectors for both blocks unreliable. However, 1020 depicts an example where the motion vectors in the x- and y-axis are reliable.

As discussed above, the division of the frame being analyzed into rectangular regions with M columns of regions and N rows of regions may be defined to exclude a portion of each frame as "margins on each side." These margins may be established so as to allow the methods to ignore potential motion and actions occurring in the peripheral regions of the frame, i.e., the regions of the frame that are likely of less interest than the portions of the frame more centered within the camera area of focus. This may help ensure that the methods do not incorrectly classify frames as being "key" frames based on movement or action occurring at the edges of the frame.

Figure 11:
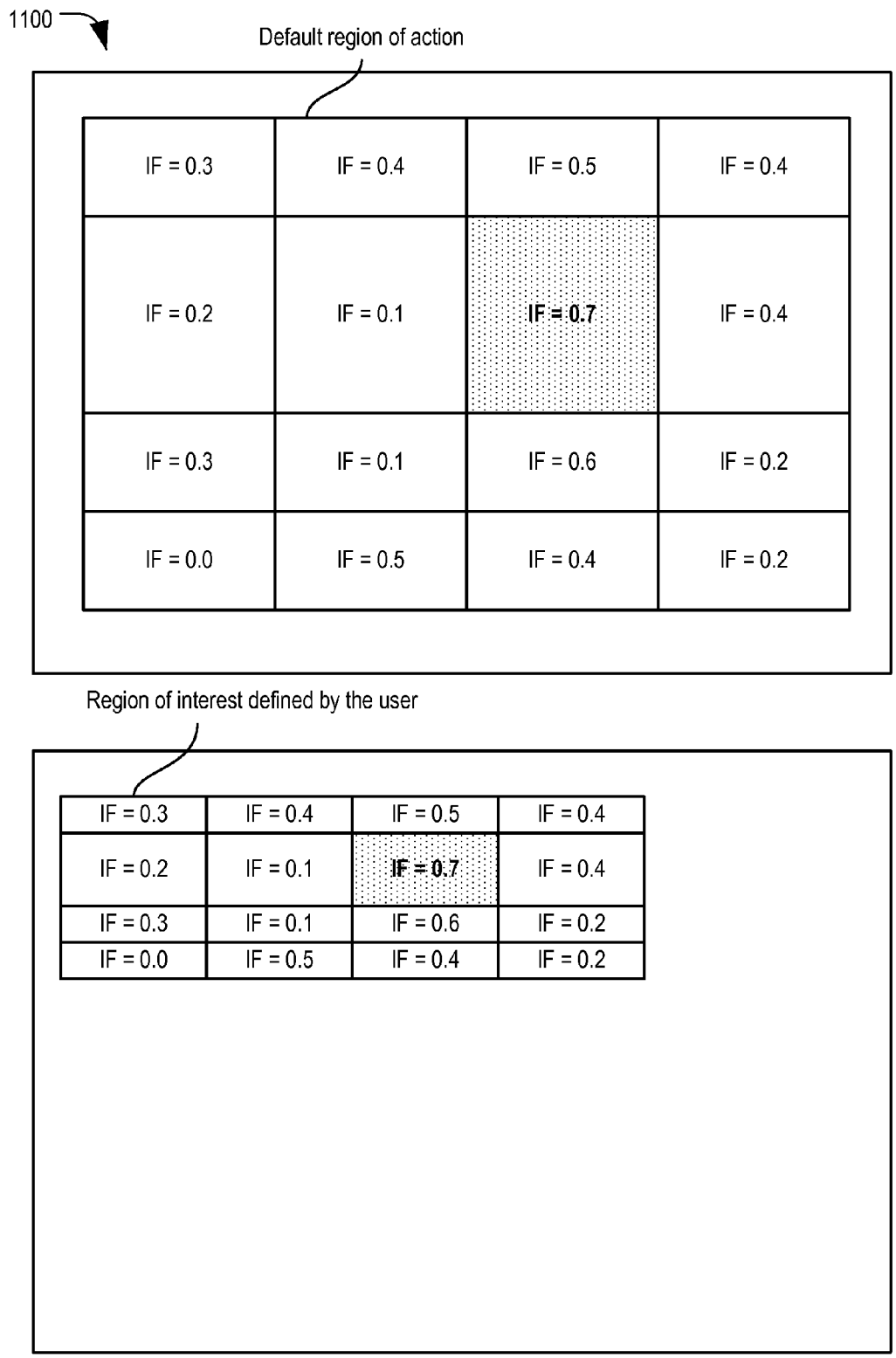

In some implementations, the user may define the portions of the frame that may contain the moments of interest, and thus may be able to tell the methods what action and movement to focus on in the classification of frames as "key" frames, as seen in FIG. 11. In FIG. 11, the entirety of the frame may be divided into 9 columns and 8 rows, however the user may define an area of importance or interest as being a block of 4 columns and 4 rows in the top left corner of the frame. In an alternate implementation, the user may select a block of any size or any location as the area to be analyzed for determination of the "key" frame.

Figure 12:
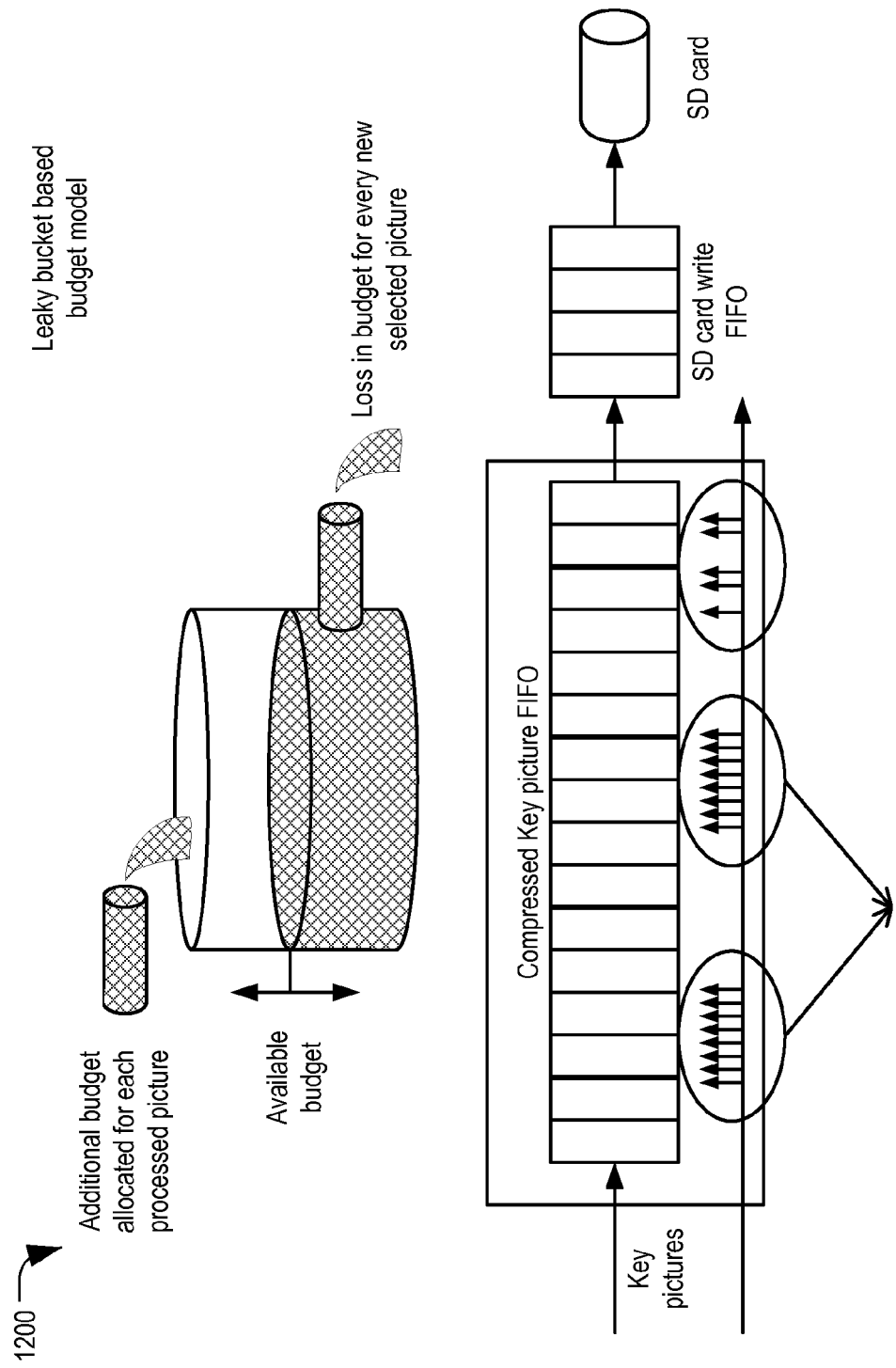
FIG. 12 is a diagram of an example of a memory budgeting scheme where frames containing moments of action may be deleted or overwritten by new pictures if the budgeted memory is full and additional frames are to be compressed and added to the memory.

FIG. 12 illustrates an example of a memory budgeting scheme wherein frames containing moments of action may be deleted or overwritten by new pictures if the budgeted memory is full and additional frames are to be compressed and added to the memory. Alternatively, new frames may not be stored in the memory until sufficient memory budget is available, i.e., the available memory meets a specific threshold. The selection of "key" frames relies upon available memory or space within the storage medium for the "key" frames to be saved and stored for the user's access. In some implementations, the system may comprise a memory budgeting scheme to ensure that the frames designated as "key" frames are properly saved in the storage medium. One scheme may comprise dropping of "key" frames if the budgeted memory is exceeded in the selection of "key" frames.

A memory budget may be defined in terms of pictures per second or MB/sec. A memory budgeting scheme may maintain specific average pictures/sec or MB/sec available memory budget. Since action moments may occur is short bursts of pictures in small temporal neighborhoods (i.e., windows of time), a "leaky bucket" memory budgeting scheme may be useful in maintaining aver picture/sec or MB/sec available memory while allowing for bursts of action pictures in short durations as shown in FIG. 12. For each frame processed, a quantum of budget may be added to the bucket. The quantum may be proportional to the budgeted pictures/sec (e.g., if 0.1 pictures/sec is average budget, and video capture rate is 30 frames per second (fps), then for each processed frame, 0.1/30=0.0033 is added to the bucket). If the processed frame is determined to be a key frame, then 1 frame is subtracted from the budget. New frames may be stored so long as the available budget in the bucket is greater than 1. In one implementation, key frame detection threshold may be determined based at least in part on available budget. If the available budget is large, the threshold may be lowered while if the available budget is small, the threshold may be increased. In another implementation, the budget may be defined as a fixed number of pictures for a given recording session.

A non-limiting advantage of the memory budgeting scheme may be that the system does not fill its memory with automatically captured moments of action. In some implementations, the system or the user of the imaging equipment may establish a budget for frames containing moments of action. Further, in some implementations, the system may comprise a scheme for deleting or overwriting frames stored in the memory.

In some implementations, the budgeting scheme may comprise deleting or overwriting frames based on temporal zones, where a temporal zone is created for compressed frames that are saved at a time greater than a threshold of time after the previous compressed frame is stored. For example, if the threshold is five seconds, then a first frame stored may be labeled as a first temporal zone, while a second frame, stored eight seconds after the first frame is stored, may be labeled as a second temporal zone. Then, a frame that has the smallest temporal distance from its neighbors can be dropped, assuming a minimum temporal density is maintained for each temporal zone.

In another implementation, if the length of a temporal group exceeds a threshold, the temporal group may be closed (i.e., new frames may not be added to it), and a new temporal group may be created in which to store subsequent key frames. When deleting frames from a temporal group, care may be taken to ensure that all temporal groups are represented in the final selection, i.e., not all the frames in a single temporal group may be deleted. Furthermore, additional constraints can be specified for deleting frames from a temporal group. For example, the density of pictures within a temporal group (i.e., the ratio of number of pictures in a group vs. the time the group covers) or the number of pictures within a temporal group (i e, minimum number of pictures in a temporal group) may be constraints controlling the deleting of pictures from temporal groups. A picture to be deleted from a temporal group may be selected based on multiple criteria. For example, a picture to be deleted having a close temporal neighbor picture may be assumed to be redundant and allowed to be deleted (i.e., one example criterion may be smallest temporal neighbor distance).

Temporal groups may be ordered based on priority. For example, each image frame (e.g., picture) in a temporal group may have a frame score that is determined based on a corresponding motion vector length, a corresponding intra MB fraction, or both. To illustrate, a frame score of an image frame may be based on an average of motion vector lengths of MBs of the image frame, an intra MB fraction of the image frame, or both. The image frames may be prioritized based on frame scores. For example, a first image frame having a first frame score may have a higher priority than a second image frame having a second frame score that is lower than the first frame score. A group score for the temporal group may be based on frame scores of image frames in the temporal group. For example, the group score may be an average of the frame scores of the image frames. The group score may indicate a level of motion activity corresponding to the temporal group. For example, a higher group score may indicate a higher level of motion activity. The temporal groups may be prioritized based on corresponding group scores. For example, a first temporal group having a first group score may have a higher priority than a second temporal group having a second group score that is lower than the first group score. Image frames may be deleted based on priority (e.g., group scores, frame scores, or both). For example, an image frame from the second temporal group may be deleted prior to deletion of an image frame from the first temporal group. As another example, a first image frame having a first frame score may be deleted prior to deletion of a second image frame having a second frame score that is higher than the first frame score.

Figure 15:
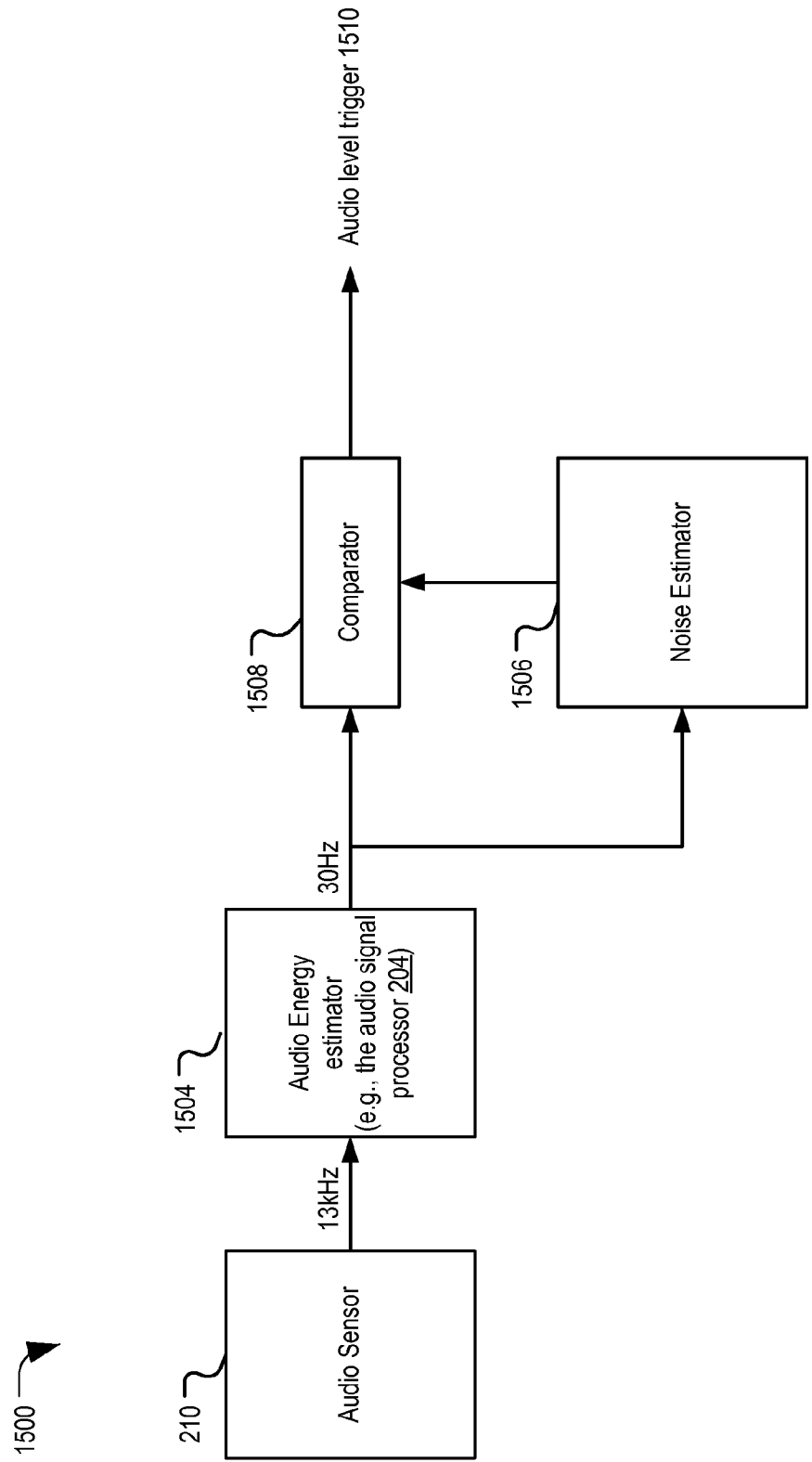
FIG. 15 is a diagram of another example of the device of FIG. 1.

Referring to FIG. 15, a diagram of a device is shown and generally designated 1500. The device 1500 may correspond to the device 100 of FIG. 1, the device 200 of FIG. 2, or both. For example, the device 1500 may be included in the device 100, the device 200, or both.

The device 1500 includes the audio sensor 210 coupled to an audio energy estimator 1504. The audio energy estimator 1504 may correspond to the audio signal processor 208 of FIG. 2. The audio energy estimator 1504 may be coupled to a comparator 1508 and to a noise estimator 1506. The noise estimator 1506 may be coupled to the comparator 1508. In a particular implementation, the trigger detector 215 may include the noise estimator 1506, the comparator 1508, or both.

During operation, the audio energy estimator 1504 may generate signal energy data based on audio samples received from the audio sensor 210, as described with reference to FIG. 2. The signal energy data may correspond to the second image frame 206. The audio energy estimator 1504 may provide the signal energy data to the noise estimator 1506 and to the comparator 1508. The noise estimator 1506 may generate a noise estimate data based on the signal energy data. For example, the noise estimator 1506 may generate the noise estimate data by performing audio ambient noise estimation based on the signal energy data corresponding to the second image frame 206. The noise estimator 1506 may provide the noise estimate data to the comparator 1508.

The comparator 1508 may adjust a signal energy threshold based on the noise estimate data. For example, the comparator 1508 may decrease the signal energy threshold in response to determining that the noise estimate data indicates a noise level that is greater than a threshold noise level. The comparator 1508 may generate an audio level trigger 1510 in response to determining that a signal energy indicated by the signal energy data satisfies the signal energy threshold. For example, the audio level trigger 1510 may indicate whether the signal energy satisfies the signal energy threshold. The trigger detector 215 may determine whether a trigger is detected based on the audio level trigger 1510, as described with reference to FIG. 17.

The device 1500 may thus enable dynamically adjusting a level of signal energy that triggers an audio level trigger based on estimated noise. For example, in a noisy environment, the audio level trigger may be generated by a higher (or lower) level of signal energy than in a quiet environment.

Figure 16:
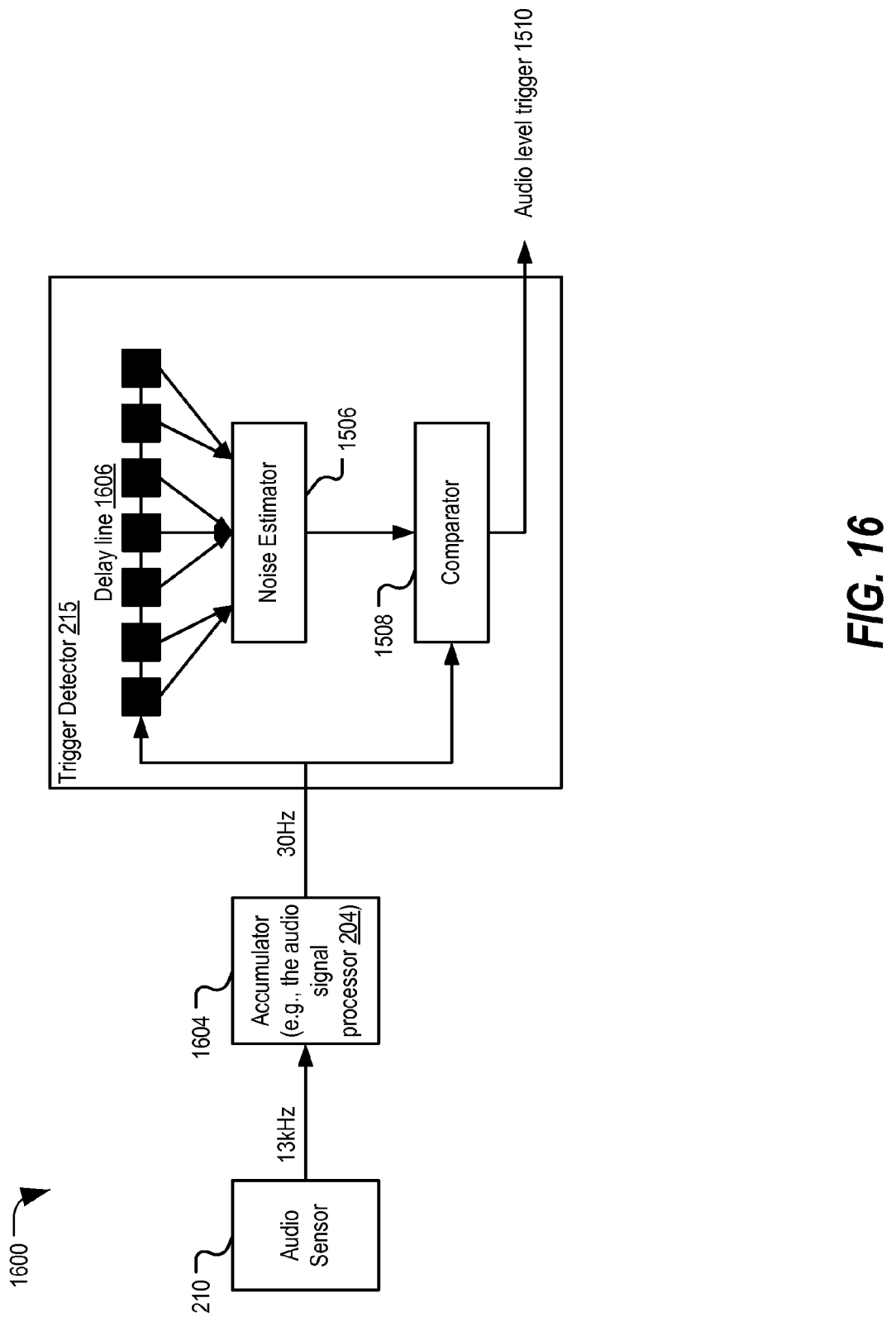
FIG. 16 is a diagram of another example of the device of FIG. 1.

Referring to FIG. 16, a diagram of a device is shown and generally designated 1600. The device 1600 may correspond to the device 100 of FIG. 1, the device 200 of FIG. 2, or both. For example, the device 1600 may be included in the device 100, the device 200, or both.

The device 1600 includes the audio sensor 210 coupled to an accumulator 1604. The accumulator 1604 may correspond to the audio signal processor 208. The accumulator 1604 may be coupled to a delay line 1606 and to the comparator 1508. The delay line 1606 may be coupled to the noise estimator 1506. The noise estimator 1506 may be coupled to the comparator 1508. In a particular implementation, the trigger detector 215 may include the delay line 1606, the noise estimator 1506, the comparator 1508, or a combination thereof.

During operation, the accumulator 1604 may receive audio samples from the audio sensor 210 at an audio sample rate (e.g., 13 kHz). The audio samples may correspond to the second image frame 206. For example, a first timestamp associated with the second image frame 206 may be within a threshold duration of timestamps associates with the audio samples. The accumulator 1604 may accumulate the audio samples over a period (e.g., 33 milliseconds) corresponding to a frame interval. The accumulator 1604 may send the accumulated audio samples to the trigger detector 215. Local fluctuations of the audio samples may be filtered out (e.g., averaged) in the accumulated audio samples. The accumulated audio samples may correspond to a video sample rate (e.g., 33 Hz) of the imaging system 105 of FIG. 1. The trigger detector 215 may add the accumulated audio samples to the delay line 1606. The delay line 1606 may include audio samples associated with one or more frames received by the trigger detector 215 prior to the second image frame 206.

The noise estimator 1506 may generate noise estimate data by performing noise estimation based on the audio samples in the delay line 1606. The noise estimator 1506 may provide the noise estimate data to the comparator 1508. The comparator 1508 may adjust a signal energy threshold based on the noise estimate data, as described with reference to FIG. 15. The comparator 1508 may generate signal energy data by estimating a signal energy corresponding to the accumulated audio samples received from the accumulator 1604. The comparator 1508 may generate the audio level trigger 1510 in response to determining that a signal energy indicated by the signal energy data satisfies the signal energy threshold. For example, the audio level trigger 1510 may indicate whether the signal energy satisfies the signal energy threshold. The trigger detector 215 may determine whether a trigger is detected based on the audio level trigger 1510, as described with reference to FIG. 17.

The device 1600 may thus enable dynamically adjusting a level of signal energy that triggers an audio level trigger corresponding to a particular frame based on estimated noise. In a noisy environment, the audio level trigger may be generated based on a higher (or lower) level of signal energy than in a quiet environment. Noise estimation may be performed based on audio samples corresponding to the particular frame and audio samples corresponding to a number of frames that precede the particular frame. The noise estimation may be update based on audio samples corresponding to the most recently received image frames. For example, background noise in the audio samples corresponding to the image frames may vary over time. Using audio samples corresponding to the most recently received image frames may result in a closer estimation of noise in the audio samples corresponding to the particular frame than using audio samples corresponding to all of the image frames.

Figure 17:
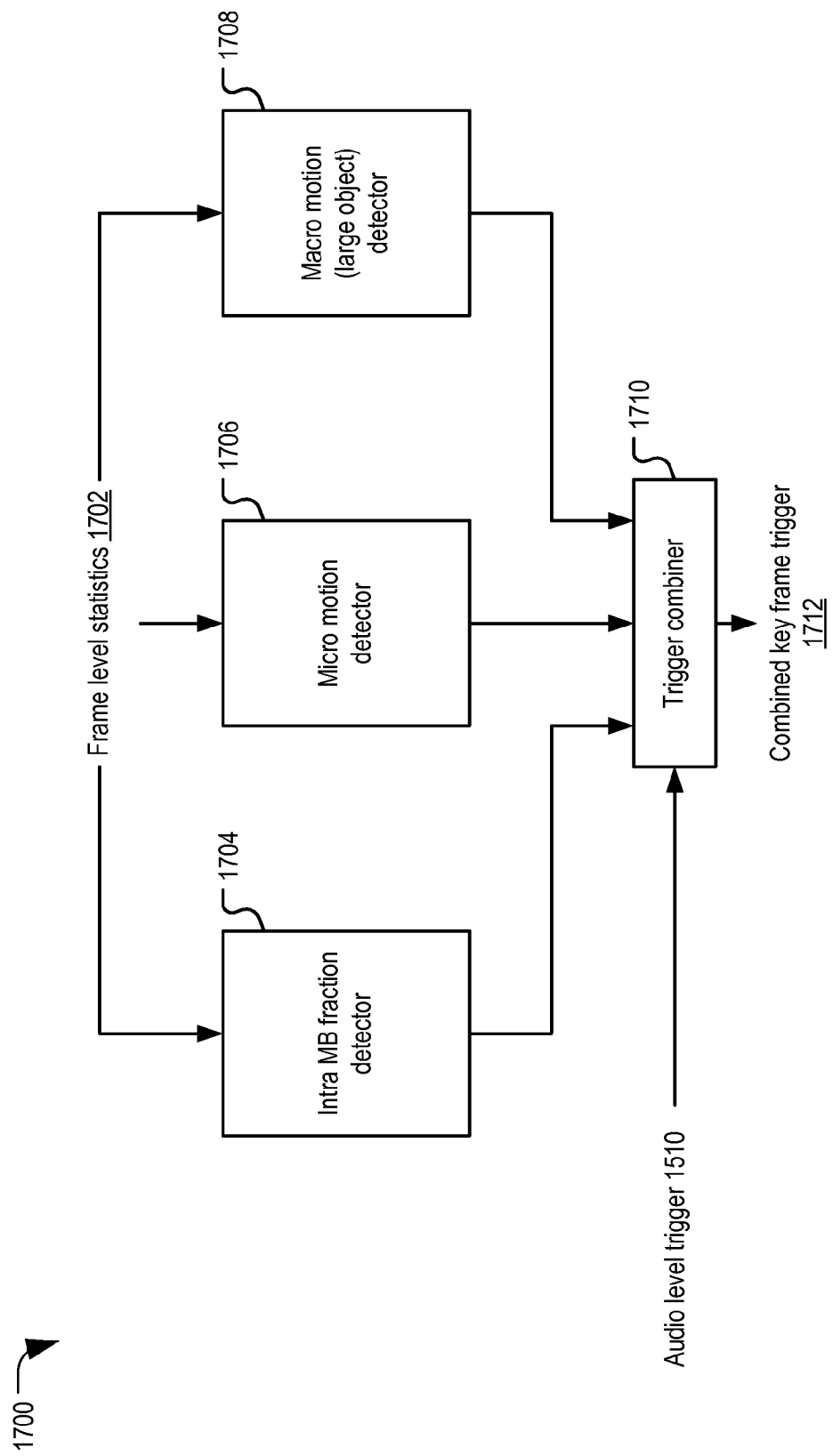
FIG. 17 is a diagram of another example of the device of FIG. 1.

Referring to FIG. 17, a device is shown and generally designated 1700. The device 1700 may correspond to the device 100 of FIG. 1, the device 200 of FIG. 2, or both. For example, the device 1700 may be included in the device 100, the device 200, or both.

The device 1700 may include an intra macro-block (MB) fraction detector 1704, a micro motion detector 1706, a macro motion detector 1708, or a combination thereof. The intra MB fraction detector 1704, the micro motion detector 1706, the macro motion detector 1708, or a combination thereof, may be coupled to a trigger combiner 1710. In a particular implementation, the trigger detector 215 of FIG. 2 may include the intra MB fraction detector 1704, the micro motion detector 1706, the macro motion detector 1708, the trigger combiner 1710, or a combination thereof.

During operation, the intra MB fraction detector 1704, the micro motion detector 1706, the macro motion detector 1708, or a combination thereof, may receive frame level statistics 1702 from the ISP 110, the video encoder 125b of FIG. 1, or both. For example, the frame level statistics 1702 may include ISP statistics, video statistics, or a combination thereof. The frame level statistics 1702 may correspond to the second image frame 206 of FIG. 2. For example, the frame level statistics 1702 may be generated based on the second image frame 206.

The intra MB fraction detector 1704 may determine whether the second image frame 206 is a key frame, as described with reference to FIG. 3, based on the frame level statistics 1702. The frame level statistics 1702 may include macro-block level statistics corresponding to the second image frame 206. The intra MB fraction detector 1704 may provide an intra MB trigger notification to the trigger combiner 1710 indicating whether the second image frame 206 is a key frame based on the macro-level block statistics.

The micro motion detector 1706 may determine whether the second image frame 206 is a key frame, as described with reference to FIG. 13, based on the frame level statistics 1702. The micro motion detector 1706 may provide a micro motion trigger notification to the trigger combiner 1710 indicating whether the second image frame 206 is a key frame based on micro motion detection.

The macro motion detector 1708 may determine whether the second image frame 206 is a key frame, as described with reference to FIG. 14, based on the frame level statistics 1702. The macro motion detector 1708 may provide a macro motion trigger notification to the trigger combiner 1710 indicating whether the second image frame 206 is a key frame based on macro motion detection.

The trigger combiner 1710 may receive the audio level trigger 1510 from the device 1500 of FIG. 15 or the device 1600 of FIG. 16. The trigger combiner 1710 may update a trigger detection threshold based on the audio level trigger 1510. For example, the trigger combiner 1710 may determine whether the audio level trigger 1510 indicates that the signal energy corresponding to the second image frame 206 satisfies the signal energy threshold, as described with reference to FIGS. 15-16. The trigger combiner 1710 may determine that a trigger count threshold (e.g., the trigger detection threshold) has a first value (e.g., 1) in response to determining that the signal energy satisfies the signal energy threshold. Alternatively, the trigger combiner 1710 may determine that the trigger count threshold has a second value (e.g., 2) in response to determining that the signal energy fails to satisfy the signal energy threshold. The trigger combiner 1710 may determine a trigger count indicating how many trigger notifications (e.g., the intra MB trigger notification, the micro motion trigger notification, and/or the macro motion trigger notification) indicate that the second image frame 206 is a key frame.

The trigger combiner 1710 may generate a combined key frame trigger notification 1712 based on the audio level trigger 1510, the intra MB trigger notification, the micro motion trigger notification, the macro motion trigger notification, or a combination thereof. For example, the trigger combiner 1710 may generate the combined key frame trigger notification 1712 based on the trigger count and the trigger count threshold. To illustrate, the combined key frame trigger notification 1712 may indicate that the second image frame 206 is a key frame in response to determining that the trigger count satisfies (e.g., is greater than or equal to) the trigger count threshold. Alternatively, the combined key frame trigger notification 1712 may indicate that the second image frame 206 is not a key frame in response to determining that the trigger count fails to satisfy (e.g., is less than) the trigger count threshold.

The trigger combiner 1710 may provide the combined key frame trigger notification 1712 to the JPEG compression engine 125a. The combined key frame trigger notification 1712 may indicate or identify the second image frame 206. For example, the combined key frame trigger notification 1712 may indicate a time stamp of the second image frame 206. The JPEG compression engine 125a may receive the first image frame 204 corresponding to the second image frame 206 from the ZSL picture buffer 120a. For example, the JPEG compression engine 125a may use the timestamp to retrieve the first image frame 204 because the first image frame 204 is associated with the same timestamp as the second image frame 206. The JPEG compression engine 125a may store the first image frame 204 in the SD card 135.

Figure 20:
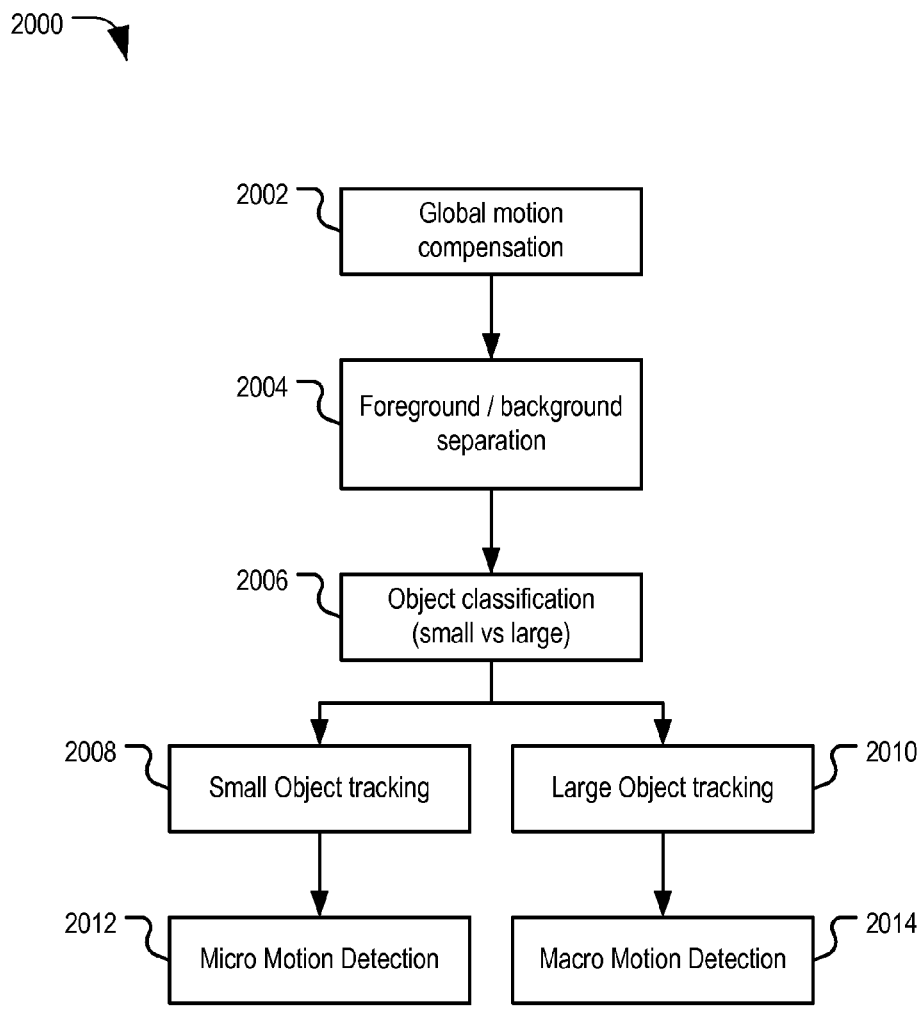
FIG. 20 is a diagram of a method of operation at an electronic device of one or more of the systems disclosed herein.

Referring to FIG. 20, a method of operation is shown and generally designated 2000. The method 2000 may be performed by the processor 115 of FIG. 1, the trigger detector 215 of FIG. 2, or both.

The method 2000 includes global motion compensation, at 2002. For example, the processor 115 of FIG. 1 may use an affine parameter model for global motion estimation and compensation. Non-translational global motion (e.g., rotation) may lead to large aggregate motion (RM) variance in the second image frame 206 of FIG. 2 even if the second image frame 206 represents a static scene. For example, a clockwise rotation may result in first motion vectors of a left side of the second image frame 206 pointing in a first direction (e.g., downwards) and second motion vectors of a right side of the second image frame 206 pointing in a second direction (e.g., upwards). The second direction may be opposite the first direction, resulting in a high RM variance. The processor 115 may perform global motion compensation to reduce (e.g., remove) the effects of the non-translational global motion in the second image frame 206.

The method 2000 also includes foreground/background separation, at 2004. For example, the processor 115 of FIG. 1 may perform foreground/background separation techniques (e.g., temporal averaging) on the second image frame 206 prior to object identification.

The method 2000 further includes object classification, at 2006. For example, the processor 115 of FIG. 1 may identify one or more objects in the second image frame 206. The processor 115 may classify a particular object of the one or more objects as a large object or a small object. In a particular implementation, an object may be identified as a large object based on a number of pixels that represent the object in the second image frame 206. For example, if the number of pixels satisfies (e.g., is greater than) a pixel threshold, the object may be classified as a large object. Alternatively, if the number of pixels fails to satisfy (e.g., is less than or equal to) the pixel threshold, the object may be classified as a small object.

The method 2000 also includes small object tracking, at 2008. For example, the processor 115 of FIG. 1 may, in response to determining that the second image frame 206 includes at least one small object, at 2006, perform small object tracking of the at least one object. Tracking the at least one small object may be useful in separating motion of the at least one small object from noise in a motion field corresponding to the second image frame 206. The method 2000 further includes micro motion detection, at 2012. For example, the processor 115 of FIG. 1 may perform micro motion detection based on motion vectors corresponding to the at least one small object. To illustrate, the processor 115

(or the micro motion detector 1706 of FIG. 17) may perform micro motion detection, as described with reference to FIGS. 13 and 17.

The method 2000 also includes large object tracking, at 2010. For example, the processor 115 of FIG. 1 may, in response to determining that the second image frame 206 includes at least one large object, at 2006, perform large object tracking of the at least one object. Tracking the at least one large object may be useful in separating motion of the at least one large object from noise in a motion field corresponding to the second image frame 206. The method 2000 further includes macro motion detection, at 2014. For example, the processor 115 of FIG. 1 may perform macro motion detection based on motion vectors corresponding to the at least one large object. To illustrate, the processor 115 (or the macro motion detector 1708 of FIG. 17) may perform macro motion detection, as described with reference to FIGS. 14 and 17.

Figure 21:
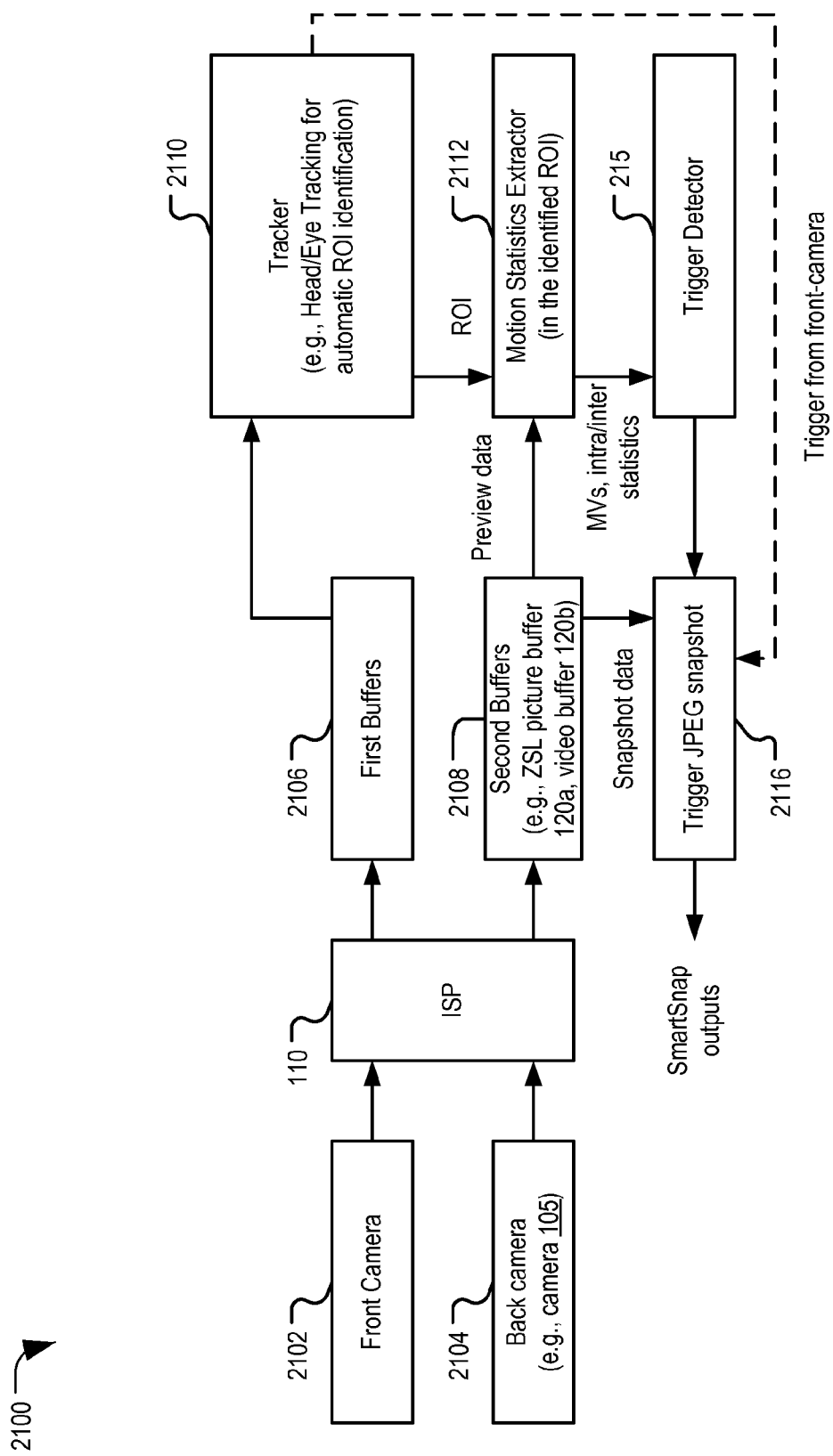
FIG. 21 is a diagram of a particular example of a method of automatically detecting a region of interest (ROI)

As discussed above, the processor 115 (e.g., the trigger detector 215) may determine that an image captured by the camera is a "key" frame or a frame containing a moment of action based on the statistics received from the video encoder 125b or statistics received from the ISP 110. In a particular aspect, the processor 115 may determine that the image captured by the camera is a key frame based on the statistics and images (e.g., user image frames) received from the ISP 110, as further described herein with reference to FIG. 21. The statistics may include information such as the intra-MB fraction or percentage of the intra-MB, motion vectors, spatial "complexity measures." Complexity measures may comprise an image intensity histogram, e.g., associated with a region of interest. The complexity measures may be calculated any number of ways in different implementations. FIG. 21 illustrates a particular example of a method of automatically detecting a region of interest (ROI). For example, the processor 115 may apply an eye/head tracking algorithm to the user image frames to estimate a direction of viewing, and may determine an ROI based on the direction of viewing, as described with reference to FIG. 21.

Referring to FIG. 21, a device is shown and generally designated 2100. The device 2100 includes a front camera 2102 and a back camera 2104 (e.g., the imaging system 105). The front camera 2102 may be distinct from the back camera 2104. The front camera 2102 and the back camera 2104 may be coupled to the ISP 110. The ISP 110 may be coupled to first buffers 2106 and to second buffers 2108. The second buffers 2108 may include the ZSL picture buffer 120a, the video buffer 120b, the DDR memory 121 of FIG. 1, or a combination thereof. The first buffers 2106 may be coupled to a tracker 2110 (e.g., a head/eye tracking component, such as a processor). The tracker 2110, the second buffers 2108, or a combination thereof, may be coupled, via a motion statistics extractor 2112, to the trigger detector 215. The trigger detector 215, the second buffers 2108, or a combination thereof, may be coupled to a trigger Joint Photographic Experts Group (JPEG) snapshot 2116.

During operation, the front camera 2102 may point toward a user, and the back camera 2104 may point toward a scene or object to be photographed. The front camera 2102 and the back camera 2104 may capture image frames and may provide the image frames to the ISP 110. For example, the front camera 2102 may provide user image frames to the ISP 110. The back camera 2104 may provide the image frames 202 of FIG. 2 to the ISP 110. The ISP 110 may provide the user image frames to the first buffers 2106, the image frames 202 to the second buffers 2108, or a combination thereof. The user image frames may correspond to the second image frame 206. For example, first timestamps of the user image frames may be within a threshold duration of a timestamp of the second image frame 206.

The ISP 110 may generate statistics based on the image frames (e.g., the user image frames and the image frames 202) from the front camera 2102 and the back camera 2104. The ISP 110 may provide the statistics associated with the user image frames (or the user image frames) to the tracker 2110. The tracker 2110 may automatically determine a ROI associated with images (e.g., the second image frame 206) captured by the back camera 2104 based on head and/or eye position and movement of the user. For example, if the user's head and/or eyes are directed to the left (based on the user images frames captured by the front camera 2102), a left side of the second image frame 206 captured by the back camera 2104 may be designated as the ROI. Conversely, if the user's head and/or eyes are directed to the right (based on user image frames captured by the front camera 2102), a right side of the second image frame 206 captured by the back camera 2104 may be designated as the ROI. The tracker 2110 may provide ROI data to the motion statistics extractor 2112. The ROI data may indicate or identify the ROI. For example, the ROI data may indicate dimensions, co-ordinates, or both, of the ROI in the second image frame 206. As another example, the ROI data may indicate a direction (left, north-east, etc.) of the ROI relative to a center of the second image frame 206. The ROI data may indicate the first timestamps of the user image frames. For example, the tracker 2110 may determine the ROI based on a particular user image frame of the user image frames. The ROI data may indicate that the ROI is associated with a particular timestamp of the particular user image frame. For example, the ROI data may indicate that, at a particular time indicated by the particular timestamp, a user's head/eyes were directed to the ROI. A second timestamp of the second image frame 206 may indicate a second time. The tracker 2110 may determine the ROI corresponding to the second image frame 206 based on the particular user image frame in response to determining that a difference between the particular time and the second time satisfies (e.g., is less than or equal to) a particular threshold.

The motion statistics extractor 2112 may use the ROI data to extract motion statistics associated with the ROI from the second image frame 206. For example, the motion statistics extractor 2112 may retrieve the second image frame 206 from the second buffers 2108 in response to determining that a timestamp of the second image frame 206 is within a threshold duration of the first timestamps of the user image frames. The motion statistics extractor 2112 may extract motion statistics (e.g., motion vector statistics, intra MB statistics, inter MB statistics, etc.) corresponding to the ROI from the image frames 202 (e.g., the second image frame 206). The motion statistics extractor 2112 may provide the motion statistics to the trigger detector 215 (e.g., a SmartSnap algorithm processor). The trigger detector 215 may determine whether a particular image frame (e.g., the second image frame 206) captured by the back camera 2104 is a key frame (e.g., to detect or generate a trigger). For example, the trigger detector 215 may detect the trigger based on the motion statistics, as described with reference to FIGS. 1-4, 13-14, and 17. The trigger detector 215 may provide a trigger notification to the trigger JPEG snapshot 2116. The trigger notification may indicate the second image frame 206. For example, the trigger notification may indicate a timestamp of the second image frame 206. The trigger JPEG snapshot 2116 may retrieve snapshot data from the second buffers 2108 in response to receiving the trigger notification. For example, the trigger JPEG snapshot 2116 may access the first image frame 204 in response to determining that the first image frame 204 has the same timestamp as the second image frame 206. The trigger JPEG snapshot 2116 may output the first image frame 204.

In a particular implementation, the tracker 2110 may provide the trigger notification to the trigger JPEG snapshot. For example, the tracker 2110 may generate the trigger notification in response to detecting a sudden movement in a head/eye direction of the user. The trigger notification may include the first timestamps of the user images. The trigger JPEG snapshot 2116 may access the first image frame 204 in response to determining that a timestamp of the first image frame 204 is within a threshold duration of the first timestamps of the user images.

Figure 22:
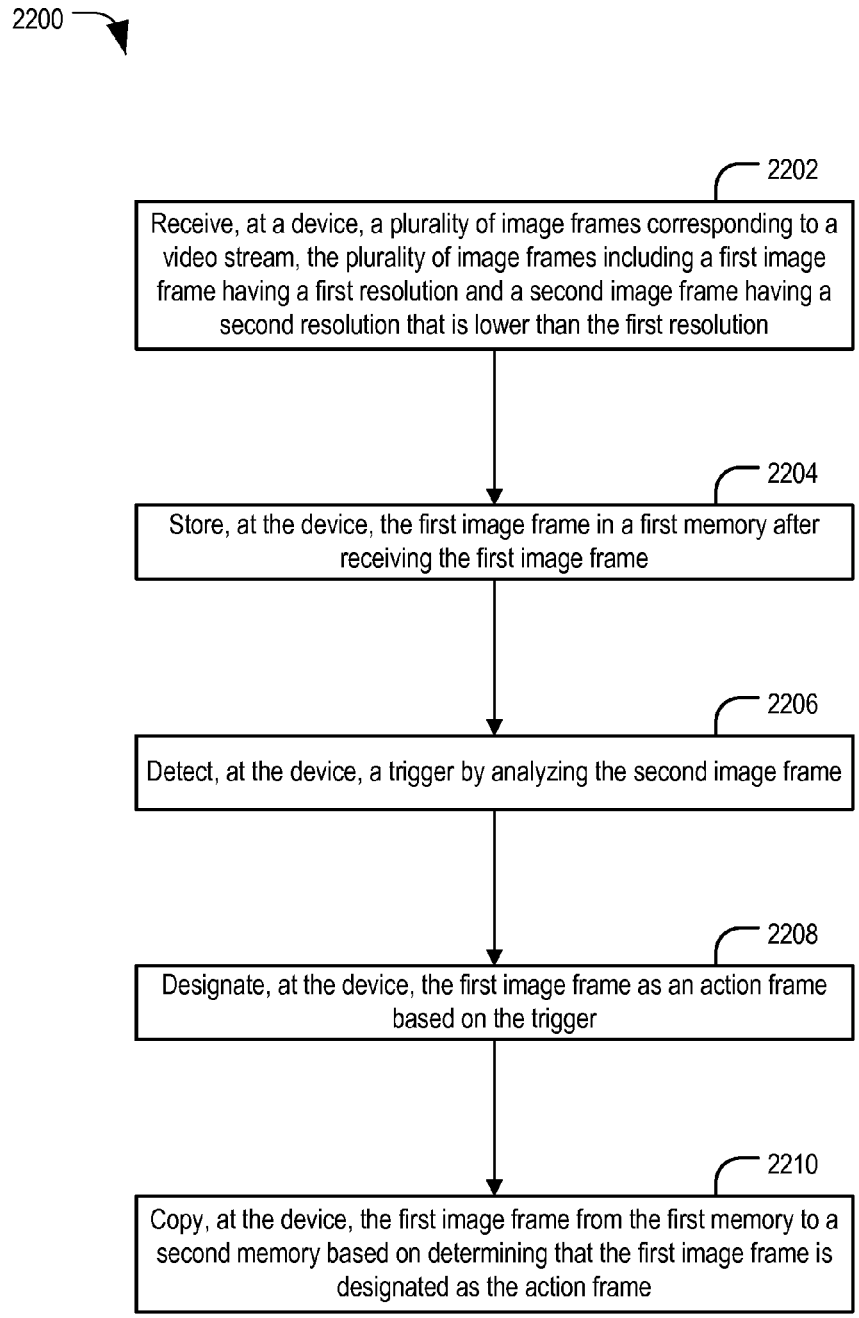
FIG. 22 is a flow chart of a method of operation at an electronic device of one or more of the systems disclosed herein.

Referring to FIG. 22, a flow chart of a method of operation is shown and generally designated 2200. The method 2200 may be performed by the device 100 of FIG. 1, the device 200 of FIG. 2, or both.

The method 2200 includes receiving, at a device, a plurality of image frames corresponding to a video stream, at 2202. For example, the ISP 110 may receive the image frames 202, as described with reference to FIG. 2. The image frames 202 may include (or correspond to) the first image frame 204 having a first resolution and the second image frame 206 having a second resolution. The second resolution may be lower than the first resolution.

The method 2200 also includes storing, at the device, the first image frame in a first memory after receiving the first image frame, at 2204. For example, the ISP 110 may store the first image frame 204 in the ZSL picture buffer 120a, the DDR memory 121, or both, after receiving the first image frame 204.

The method 2200 further includes detecting, at the device, a trigger by analyzing the second image frame, at 2206. For example, the trigger detector 215 of FIG. 2 may detect a trigger by analyzing the second image frame 206, as described with reference to FIG. 2. To illustrate, the trigger detector 215 may determine cumulative statistics for each region of a plurality of regions of the second image frame 206, as described with reference to FIG. 3. The trigger detector 215 may detect the trigger based on the cumulative statistics, as described with reference to FIG. 3. The cumulative statistics include at least one of intra macro-block fractions and variance of cumulative motion.

The method 2200 also includes designating, at the device, the first image frame as an action frame based on the trigger, at 2208. For example, the trigger detector 215 of FIG. 2 may designate the first image frame 204 as an action frame based on the trigger, as described with reference to FIG. 2.

The method 2200 further includes copying, at the device, the first image frame from the first memory to a second memory based on determining that the first image frame is designated as the action frame, at 2210. For example, the JPEG compression engine 125a of FIGS. 1-2 may copy the first image frame 204 of FIG. 2 from the ZSL picture buffer 120a or from the DDR memory 121 to the SD card 135 based on determining that the first image frame 204 is designated as the action frame, as described with reference to FIG. 2.

Referring to FIG. 23, a flow chart of a method of operation is shown and generally designated 2300. The method 2300 may correspond to 2206 of FIG. 22.

The method 2300 includes determining, at the device, first data based on the plurality of image frames, at 2302. For example, the trigger detector 215 of FIG. 2 may determine first data based on the image frames 202, as described with reference to FIGS. 2 and 13. The first data may be indicative of motion of a first object (e.g., a small object), as described with reference to FIG. 13.

The method 2300 also includes determining, at the device, second data based on the plurality of image frames, at 2304. For example, the trigger detector 215 of FIG. 2 may determine second data based on the image frames 202, as described with reference to FIGS. 2 and 14. The second data may be indicative of motion of a second object (e.g., a large object). The first object may be represented in the second image frame 206 by a first number of pixels. The second object may be represented in the second image frame 206 by a second number of pixels. The second number of pixels may be greater than the first number of pixels. The trigger detector 215 may detect the trigger based on the first data satisfying a first threshold, the second data satisfying a second threshold, or both, as described with reference to FIGS. 2, 13, and 14.

Referring to FIG. 24, a flow chart of a method of operation is shown and generally designated 2400. The method 2400 may correspond to 2206 of FIG. 22.

The method 2400 includes analyzing, at the device, the second image frame to determine motion data indicative of motion, at 2402. For example, the trigger detector 215 of FIG. 2 may analyze the second image frame 206 to determine motion data indicative of motion, as described with reference to FIGS. 2, 13, 14, and 17.

The method 2400 also includes receiving audio data at the device, at 2404. For example, the trigger detector 215 of FIG. 2 may receive audio data, as described with reference to FIGS. 2 and 15-17. The audio data may correspond to the video stream. For example, the audio data may correspond to the image frames 202, as described with reference to FIG. 2.

The method 2400 further includes updating, at the device, a trigger detection threshold based on a characteristic of the audio data, at 2406. For example, the trigger detector 215 may update a trigger detection threshold based on a characteristic of the audio data, as described with reference to FIGS. 2 and 17. The trigger detection threshold may include the threshold value compared to the mIF at block 320 of FIG. 3, the threshold value compared to the calculated variance at block 440 of FIG. 4, a threshold value compared to an average length at block 1312 of FIG. 13, a threshold value compared to motion vector lengths at block 1404 of FIG. 14, a threshold value compared to a largest connected component size at block 1412 of FIG. 14, a trigger detection threshold of the trigger combiner 1710 of FIG. 17, or a combination thereof. The trigger detector 215 may detect the trigger based on the motion data satisfying the trigger detection threshold, as described with reference to FIGS. 2-4, 13-14, and 17.

Referring to FIG. 25, a flow chart of a method of operation is shown and generally designated 2500. The method 2500 may correspond to 2206 of FIG. 22.

The method 2500 includes receiving, at the device, second image frames at the device, at 2502. For example, the ISP 110 of FIGS. 1-2 and 21 may receive user image frames, as described with reference to FIG. 21.

The method 2500 also includes determining, at the device, at least one of a head direction of a user or an eye direction of the user based on the second image frames, at 2504. For example, the tracker 2110 may determine at least one of a head direction of a user or an eye direction of the user based on the user image frames, as described with reference to FIG. 21.

The method 2500 further includes determining, at the device, a region of interest of the second image frame based on at least one of the head direction or the eye direction, at 2506. For example, the tracker 2110 may determine a region of interest (ROI) of the second image frame 206 based on at least one of the head direction or the eye direction, as described with reference to FIG. 21. The trigger detector 215 may detect the trigger based on the region of interest, as described with reference to FIG. 21. The image frames 202 may be received via the back camera 2104, as described with reference to FIG. 21. The user image frames may be received via the front camera 2102, as described with reference to FIG. 21.

In some implementations, the ISP 110 and the video encoder 125b may perform one or more operations of the methods and systems described herein. In some other implementations, the processor 115, the trigger detector 215, or both, may perform one or more operations of the methods and systems described herein. The processor 115, the trigger detector 215, or both, may receive the statistics regarding image or video frames from the ISP 110 and the video encoder 125b, respectively, wherein the "statistics" received from the ISP 110 and the video encoder 125b comprise the macro block level statistics discussed above along with frame and image data of the one or more frames to be analyzed for moments of action.

As described above, a determination of the "moment of interest" may be based upon statistics extracted by the ISP 110, statistics generated by the video codec 125b, triggers from the processor 115, or triggers detected by the trigger detector 215. However, the determination may also analyze various additional sources, for example audio or visual sources. The determination that a captured frame contains a moment of action may be at least partially based on audio captured in conjunction with the image or video clip frame being analyzed. For example, a sudden increase in background audio between analyzed frames may be used to determine a moment of action. Similarly, specific commands from the user may be detected in conjunction with the captured frame to indicate a moment of action in the corresponding captured frame(s). Alternatively, a frame being examined may contain a moment of action if either a localized change in luminance is detected, which may be indicated by a large intra macro-block fraction, or a localized movement is detected, which may be indicated by a large motion variance.

In some implementations, one or more of the operations of the methods and systems discussed herein may be coded in C and may be configured to be included with the operating software of existing imaging equipment, installable via a software update. The action frame detection feature may be integrated into existing systems and may function in conjunction with other automatic image detection systems, for example facial expression recognition systems or manual shot selection systems.

The proposed selection methods may be highly effective in detecting and capturing moments of action. The proposed methods may not rely upon user interaction or attention to capture the moments of interest, and thus may provide for more effective capture of moments of action. The methods may function in real time to select moments of interest from already captured images that are temporarily stored in buffer memory and may eliminate any user reaction time in the event of a moment of interest within the range of video capture rate (e.g., 30 fps).

The proposed SmartSnap methods may be used in various modes. For example, a video record mode may exist where the video may be recorded at low resolution (e.g., HD resolution), and additionally, selected action frames are recorded at high resolution (e.g., maximum imaging equipment resolution). In another example, a preview mode may exist that utilizes the video encoding engine to actively process incoming frames at video resolution and generates macroblock statistics, which may be used by the SmartSnap method to select key frames. In the preview mode, the output of the video encoder may not be stored, and the identified action frames may be stored at high resolution. Additionally, other modes may be defined based at least in part on intended type of video record or preview session, such as a short clip or a long clip. In some implementations, allocated memory budget may vary based on the type of session.

Figure 26:
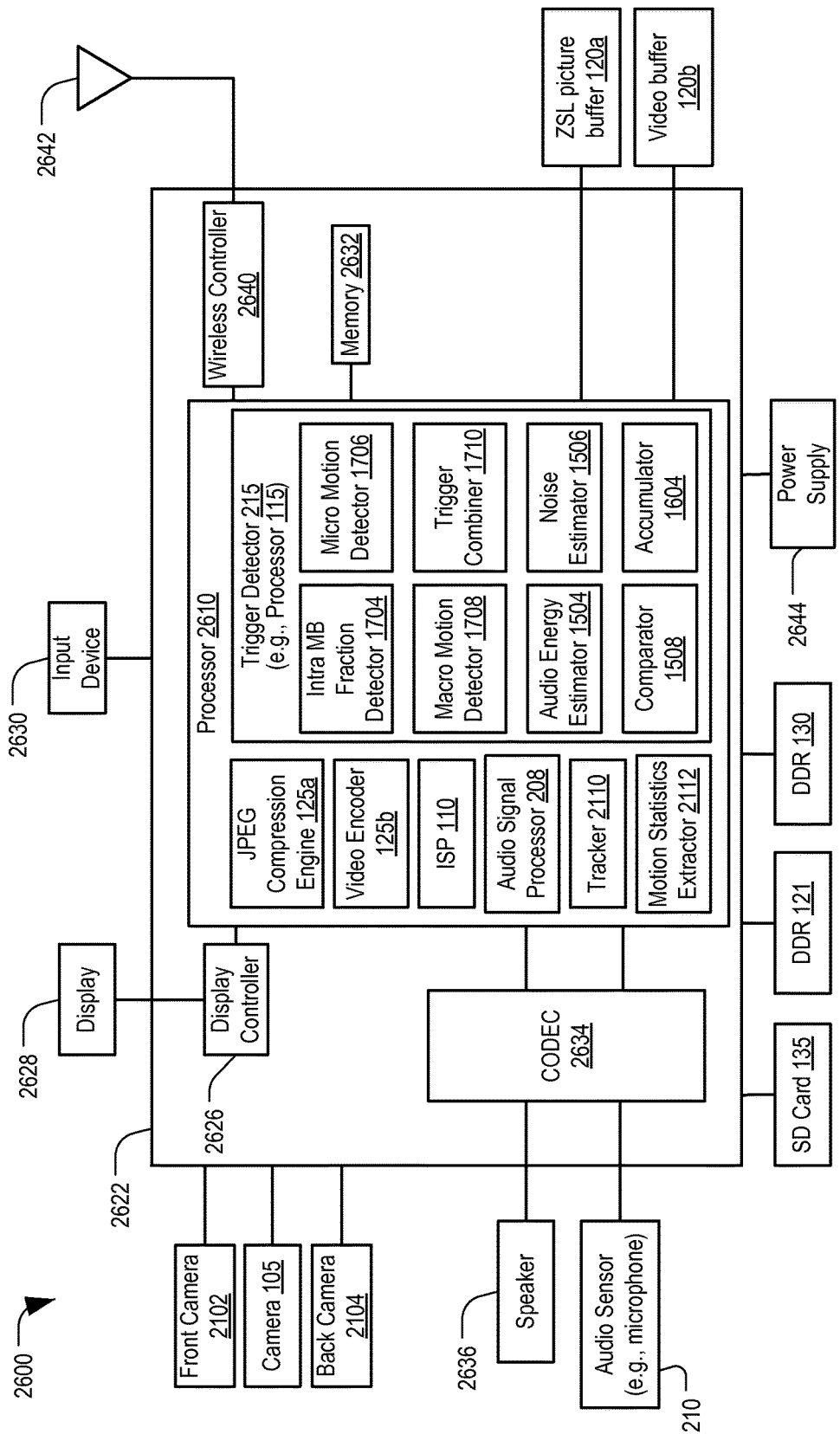
FIG. 26 is a diagram of a device that is operable to support various implementations of one or more methods, systems, apparatuses, and computer-readable media disclosed herein.

Referring to FIG. 26, a particular illustrative example of a communication device is depicted and generally designated 2600. The device 2600 includes a processor 2610, such as a digital signal processor, coupled to a memory 2632. In an illustrative example, the device 2600, or components thereof, may correspond to the device 100 of FIG. 1, the device 200 of FIG. 2, the device 1500 of FIG. 15, the device 1600 of FIG. 16, the device 1700 of FIG. 17, the device 2100 of FIG. 21, or components thereof. The processor 2610 may include the processor 115 of FIG. 1, the trigger detector 215 of FIG. 2, or both. The trigger detector 215 may include the audio energy estimator 1504, the noise estimator 1506, the comparator 1508 of FIG. 15, the accumulator 1604 of FIG. 16, the intra MB fraction detector 1704, the micro motion detector 1706, the macro motion detector 1708, the trigger combiner 1710 of FIG. 17, or a combination thereof. The processor 2610 may include the ISP 110, the JPEG compression engine 125a, the video encoder 125b of FIG. 1, the audio signal processor 208 of FIG. 2, the tracker 2110, the motion statistics extractor 2112 of FIG. 21, or a combination thereof.

The processor 2610 may be configured to execute software (e.g., a program of one or more instructions) stored in the memory 2632. Additionally or alternatively, the processor 2610 may be configured to execute one or more instructions stored in a memory of a wireless controller 2640 (e.g., an Institute of Electrical and Electronics Engineers (IEEE) 802.11 compliant interface). For example, the wireless controller 2640 may be configured to operate in accordance with one or more wireless communication standards, including one or more IEEE 802.11 standards and one or more NAN standards. In a particular implementation, the processor 2610 may be configured to perform one or more operations or methods described with reference to FIGS. 1-25. For example, the processor 2610 may be configured to receive a plurality of image frames (e.g., the image frames 202) corresponding to a video stream. The image frames 202 may include the first image frame 204 and the second image frame 206. The second image frame 206 may have a lower resolution than the first image frame 204. The processor 2610 may also be configured to store the first image frame 204 in the ZSL picture buffer 12a or in the DDR memory 121 after receiving the first image frame 204. The processor 2610 may be further configured to detect a trigger by analyzing the second image frame 206. The processor 2610 may also be configured to designate the first image frame 204 as an action frame based on the trigger. The processor 2610 may be further configured to copy the first image frame 204 from the ZSL picture buffer 12a or from the DDR memory 121 to the SD card 135 based on determining that the first image frame 204 is designated as the action frame.

The wireless controller 2640 may be coupled to the processor 2610 and to an antenna 2642. For example, the wireless controller 2640 may be coupled to the antenna 2642 such that wireless data may be received via the antenna 2642 and may be provided to the processor 2610.

A coder/decoder (CODEC) 2634 can also be coupled to the processor 2610. A speaker 2636 and the audio sensor 210 (e.g., a microphone) can be coupled to the CODEC 2634. A display controller 2626 can be coupled to the processor 2610 and to a display device 2628. In a particular implementation, the processor 2610, the display controller 2626, the memory 2632, the CODEC 2634, and the wireless controller 2640 are included in a system-in-package or system-on-chip device 2622. In a particular implementation, an input device 2630, a power supply 2644, the imaging system 105 (e.g., a camera), the front camera 2102, the back camera 2104, the SD card 135, the DDR memory 121, and the DDR memory 130 are coupled to the system-on-chip device 2622. Moreover, in a particular example, as illustrated in FIG. 26, the display device 2628, the input device 2630, the imaging system 105, the front camera 2102, the back camera 2104, the speaker 2636, the audio sensor 210, the SD card 135, the DDR memory 121, the DDR memory 130, the antenna 2642, and the power supply 2644 are external to the system-on-chip device 2622. However, each of the display device 2628, the input device 2630, the imaging system 105, the front camera 2102, the back camera 2104, the speaker 2636, the audio sensor 210, the SD card 135, the DDR memory 121, the DDR memory 130, the antenna 2642, and the power supply 2644 can be coupled to one or more components of the system-on-chip device 2622, such as one or more interfaces or controllers. In a particular implementation, the device 2600 may include at least one of a communications device, a music player, a video player, an entertainment unit, a navigation device, a personal digital assistant (PDA), a mobile device, a computer, a decoder, or a set top box.

In conjunction with the described examples, an apparatus includes means for storing a plurality of image frames corresponding to a video stream. For example, the means for storing may include the ZSL picture buffer 120a, the DDR memory 121, the video buffer 120b, the DDR memory 130, the SD card 135, the device 100 of FIG. 1, the device 200 of FIG. 2, the device 1500 of FIG. 15, the device 1600 of FIG. 16, the device 1700 of FIG. 17, the device 2100 of FIG. 21, the memory 2632, one or more other devices, circuits, modules, or instructions configured to store a plurality of image frames, or a combination thereof.

The apparatus also includes first means for analyzing a first image frame of the plurality of image frames to generate first motion data indicative of motion of a first object. For example, the first means for analyzing may include the video encoder 125b, the processor 115, the trigger detector 215, the motion statistics extractor 2112, the device 100 of FIG. 1, the device 200 of FIG. 2, the device 1500 of FIG. 15, the device 1600 of FIG. 16, the device 1700 of FIG. 17, the device 2100 of FIG. 21, the processor 2610 programmed to execute instructions stored in the memory 2632, one or more other devices, circuits, modules, or instructions configured to analyze a first image frame to generate first motion data, or a combination thereof.

The apparatus further includes means for determining that the first image frame includes the first object based on determining that the first motion data satisfies a first object motion threshold. For example, the means for determining may include the processor 115, the trigger detector 215, the micro motion detector 1706, the macro motion detector 1708, the device 100 of FIG. 1, the device 200 of FIG. 2, the device 1500 of FIG. 15, the device 1600 of FIG. 16, the device 1700 of FIG. 17, the device 2100 of FIG. 21, the processor 2610 programmed to execute instructions stored in the memory 2632, one or more other devices, circuits, modules, or instructions configured to determine that the first image frame includes the first object, or a combination thereof. To illustrate, the micro motion detector 1706 may determine that the second image frame 206 of FIG. 2 includes a small object in response to determining that the second image frame 206 is a key frame. The macro motion detector 1708 may determine that the second image frame 206 includes a large object in response to determining that the second image frame 206 is a key frame.

The apparatus also includes means for detecting a trigger when the first image frame includes the first object. For example, the means for detecting may include the processor 115, the trigger detector 215, the trigger combiner 1710, the device 100 of FIG. 1, the device 200 of FIG. 2, the device 1500 of FIG. 15, the device 1600 of FIG. 16, the device 1700 of FIG. 17, the device 2100 of FIG. 21, the processor 2610 programmed to execute instructions stored in the memory 2632, one or more other devices, circuits, modules, or instructions configured to detect a trigger, or a combination thereof.

The apparatus further includes means for designating a second image frame of the plurality of image frames as an action frame based on the trigger. For example, the means for designating may include the processor 115, the JPEG compression engine 125a, the trigger detector 215, the trigger combiner 1710, the device 100 of FIG. 1, the device 200 of FIG. 2, the device 1500 of FIG. 15, the device 1600 of FIG. 16, the device 1700 of FIG. 17, the device 2100 of FIG. 21, the processor 2610 programmed to execute instructions stored in the memory 2632, one or more other devices, circuits, modules, or instructions configured to designate an image frame as an action frame, or a combination thereof.

Implementing Systems and Technology

Implementations disclosed herein provide systems, methods and apparatus for automatic detection of moments of action and capturing said moments of action. One skilled in the art will recognize that these examples may be implemented in hardware, software, firmware, or any combination thereof.

In some implementations, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, and a memory including instructions or modules for carrying out the multispectral iris authentication processes discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope consistent with the principles and novel features disclosed herein.

What is claimed is:

1. An apparatus comprising:
a memory configured to store a plurality of image frames corresponding to a video stream;
a first object detector configured to determine whether a first image frame of the plurality of image frames includes a first object;
a first object motion analyzer configured to, subsequent to the first object detector determining that the first image frame includes the first object, analyze the first image frame to generate first motion data corresponding to the first object;
a trigger detector configured to detect a trigger based on determining that the first motion data satisfies a first object motion threshold, the first object motion threshold determined based on data associated with one or more image frames, the one or more image frames prior to the first image frame in the plurality of image frames; and
a frame designator configured to designate a second image frame of the plurality of image frames as an action frame based on the trigger.

2. The apparatus of claim 1, wherein the first motion data indicates a connected component size that is determined by performing connected component analysis of the first image frame.

3. The apparatus of claim 1, further comprising:
a second object detector configured to determine whether the first image frame includes a second object; and
a second object motion analyzer configured to, subsequent to the second object detector determining that the first image frame includes the second object, analyze the first image frame to generate second motion data indicative of motion of the second object,
wherein the trigger detector is further configured to detect the trigger based on determining that the second motion data satisfies a second object motion threshold.

4. The apparatus of claim 3, wherein the second motion data indicates a motion vector length of a set of macro-blocks of the first image frame, and wherein the set of macro-blocks corresponds to textured areas of the first image frame.

5. The apparatus of claim 3, wherein the first object is represented in the first image frame by a first number of pixels, and wherein the second object is represented in the first image frame by a second number of pixels that is less than the first number of pixels.

6. The apparatus of claim 1, further comprising:
a microphone configured to receive audio data corresponding to the video stream; and
a threshold adjuster configured to update the first object motion threshold based on a characteristic of the audio data.

7. The apparatus of claim 6, wherein the first image frame includes a first timestamp indicating a first time, wherein the characteristic of the audio data is associated with a second timestamp indicating a second time, wherein the second time is subsequent to the first time, and wherein a difference between the second time and the first time satisfies a threshold.

8. The apparatus of claim 1, further comprising:
a region of interest identifier configured to:
determine at least one of a head direction of a user or an eye direction of the user based on third image frames; and
determine a region of interest of the first image frame based on at least one of the head direction or the eye direction,
wherein the first motion data is generated by analyzing the region of interest,
wherein the plurality of image frames are received via a first camera,
wherein the third image frames are received via a second camera that is distinct from the first camera.

9. The apparatus of claim 8,
wherein the first object detector is configured to determine whether the region of interest includes the first object, and
wherein the first motion data is generated by analyzing the region of interest subsequent to the first object detector determining that the region of interest includes the first object.

10. The apparatus of claim 1, further comprising a processor configured to:
store the first image frame in a first buffer after receiving the first image frame;
store the second image frame in a second buffer after receiving the second image frame; and
copy the second image frame from the second buffer to a second memory based on determining that the second image frame is designated as the action frame.

11. The apparatus of claim 1, wherein the memory, the first object detector, the first object motion analyzer, the trigger detector, and the frame designator are include in a mobile communication device.

12. The apparatus of claim 1, wherein the first image frame has a first timestamp indicating a first time, wherein the second image frame has a second timestamp indicating a second time, wherein a difference between the first time and the second time satisfies a threshold, wherein the frame designator is further configured to designate one or more other image frames of the plurality of image frames as action frames based on the trigger, and wherein differences between a time indicated by a timestamp of each of the one or more other image frames and the first time satisfy the threshold.

13. The apparatus of claim 1, wherein the first image frame represents a first camera view that is substantially the same as a second camera view represented by the second image frame, and further comprising:
a camera configured to provide the first camera view to capture the plurality of image frames corresponding to the video stream; and
a display device configured to output the first image frame, the display device coupled to the memory and to a display controller, wherein the first camera view corresponds to a viewing angle, a viewing distance, or both, of the camera, and wherein the camera is coupled to the display device.

14. The apparatus of claim 1, wherein the trigger is detected based on cumulative mode statistics of a region of interest, motion data indicative of motion of an object that is represented in the region of interest, or a combination thereof.

15. The apparatus of claim 1, further comprising:
a camera configured to capture the second image frame; and
a display device configured to output the second image frame, the display device coupled to the memory and to a display controller, wherein the first image frame is generated from the first image frame.

16. The apparatus of claim 1, further comprising a processor that includes the first object detector, the first object motion analyzer, the trigger detector, and the frame designator are include in a mobile communication device.

17. The apparatus of claim 16, wherein the processor is configured to copy one or more other image frames from the memory to a second memory based on determining that the one or more other image frames are designated as action frames.

18. The apparatus of claim 16, wherein the processor is configured to copy the second image frame from the memory to a second memory based on determining that the second image frame is designated as the action frame, and wherein the first image frame is a lower resolution frame than the second image frame.

19. The apparatus of claim 16, wherein the processor is configured to determine cumulative statistics for each region of a plurality of regions of the first image frame, wherein the trigger is detected based on the cumulative statistics, and wherein the cumulative statistics include at least one of region intra macro-block (MB) fractions and variance of cumulative motion.

20. The apparatus of claim 19, wherein the processor is further configured to determine a region motion metric for each region of the plurality of regions based on motion vectors of MBs included in the region, wherein the first image frame includes a plurality of MBs, wherein the processor is further configured to determine global motion values of the first image and to determine a plurality of cumulative motion vectors for the plurality of regions, each cumulative motion vector of the plurality of cumulative motion vectors determined based on a region motion metric of a corresponding region and the global motion values, and wherein a first variance of cumulative motion vectors for a first region of the plurality of regions is determined based on a first plurality of cumulative motion vectors for the first region.

21. The apparatus of claim 19, wherein the processor is further configured to determine a region intra MB fraction for each region of the plurality of regions based on intra MB fractions for one or more MBs included in the region, wherein the first image frame includes a plurality of MBs, and wherein a particular intra MB fraction for each MB of the one or more MBs is determined based on first characteristics of the MB and second characteristics of a reference MB of the plurality of MBs.

22. The apparatus of claim 16, wherein the processor is configured to determine a frame score of the second image frame, wherein a second memory stores multiples image frames in a plurality of groups, wherein a group of the plurality of groups includes the first image frame, and wherein the processor is further configured to update a group score of the group based on the frame score and to select a particular image frame of a particular group of the plurality of groups based on a particular frame score of the particular image frame, a particular group score of the particular group, or both.

23. The apparatus of claim 22, wherein the processor is configured to delete the particular image frame from the second memory, wherein the memory includes a first-in first-out (FIFO) buffer, and wherein the second memory has a larger storage capacity than the memory.

24. An apparatus comprising:
means for storing a plurality of image frames corresponding to a video stream;
first means for analyzing a first image frame of the plurality of image frames to generate first motion data corresponding to a first object;
means for determining that the first image frame includes the first object based on determining that the first motion data satisfies a first object motion threshold, the first object motion threshold determined based on data associated with one or more image frames, the one or more image frames prior to the first image frame in the plurality of image frames;
means for detecting a trigger based on determining that the first image frame includes the first object; and
means for designating a second image frame of the plurality of image frames as an action frame based on the trigger.

25. The apparatus of claim 24, further comprising:
second means for analyzing the first image frame to generate second motion data corresponding to a second object; and
means for determining that the first image frame includes the second object based on determining that the second motion data satisfies a second object motion threshold, wherein the means for detecting is further configured to detect the trigger based on determining that the first image frame includes the second object.

26. The apparatus of claim 24, wherein the means for storing, the first means for analyzing, the means for determining, the means for detecting, and the means for designating are integrated into at least one of a mobile device, a communications device, a computer, an entertainment unit, a navigation device, a personal digital assistant (PDA), a music player, a video player, a decoder, or a set top box.

27. An apparatus comprising:
means for storing a plurality of image frames corresponding to a video stream;
means for determining whether a first image frame of the plurality of image frames includes a first object;
means for analyzing the first image frame to generate first motion data indicative of motion of the first object when the first image frame includes the first object;
means for detecting a trigger when the first motion data satisfies a first object motion threshold, the first object motion threshold determined based on data associated with one or more image frames, the one or more image frames prior to the first image frame in the plurality of image frames; and
means for designating a second image frame of the plurality of image frames as an action frame based on the trigger.

28. The apparatus of claim 27, wherein the first image frame has a first timestamp indicating a first time, wherein the second image frame has a second timestamp indicating a second time, and wherein a difference between the first time and the second time satisfies a threshold, and further comprising:
means for capturing the plurality of image frames;
means for receiving audio data corresponding to the video stream; and
means for updating a trigger detection threshold based on a characteristic of the audio data, wherein the trigger is detected based on the trigger detection threshold.

* * * * *